(12) United States Patent
Kuhnke et al.

(10) Patent No.: US 12,487,981 B2
(45) Date of Patent: Dec. 2, 2025

(54) APPARATUS AND METHODS FOR PACKETIZED DATA MANAGEMENT AND DELIVERY IN A DIGITAL CONTENT DISTRIBUTION NETWORK

(71) Applicant: CHARTER COMMUNICATIONS OPERATING, LLC, St. Louis, MO (US)

(72) Inventors: Jeffrey Kuhnke, Frederick, CO (US); Christopher Sammoury, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 18/222,794

(22) Filed: Jul. 17, 2023

(65) Prior Publication Data
US 2023/0359607 A1 Nov. 9, 2023

Related U.S. Application Data

(62) Division of application No. 15/631,423, filed on Jun. 23, 2017, now Pat. No. 11,704,300.

(51) Int. Cl.
*H04N 21/20* (2011.01)
*G06F 16/23* (2019.01)
(Continued)

(52) U.S. Cl.
CPC .......... *G06F 16/23* (2019.01); *G06F 16/2386* (2019.01); *H04L 67/00* (2013.01); *H04L 67/10* (2013.01); *H04N 21/20* (2013.01); *H04N 21/2225* (2013.01); *H04N 21/23* (2013.01); *H04N 21/262* (2013.01);
(Continued)

(58) Field of Classification Search
CPC .... H04N 21/20; H04N 21/2225; H04N 21/23; H04N 21/262; H04N 21/26258; H04N 21/2665; H04N 21/2747; H04N 21/64322; H04N 21/60
See application file for complete search history.

(56) References Cited

U.S. PATENT DOCUMENTS 8,762,434 B1 * 6/2014 Haynes ................... G06F 16/13
707/827
8,997,136 B2 3/2015 Brooks et al.
(Continued)

*Primary Examiner* — Pinkal R Chokshi
(74) *Attorney, Agent, or Firm* — Patent Beach PC

(57) ABSTRACT

Apparatus and methods for managing provision of digital content within a content distribution network. In one embodiment, a content application manager (CAM) process is used to provide one or more centralized redirection functions for network client processes such as just-in-time (JIT) packagers and cloud digital video recorders (cDVRs). A local database accessible to the CAM is updated with "live" or other content storage locations within the network, and accordingly each of the client processes can be made simpler and not require any intrinsic knowledge of content asset storage locations. This simplifies the client process configuration, enhances performance in terms of reduced end-user request servicing latency, and allows for single-point automated database updates versus having to provide updates to each client process as under the prior art.

20 Claims, 14 Drawing Sheets

(51) Int. Cl.
  *H04L 67/00* (2022.01)
  *H04L 67/10* (2022.01)
  *H04N 21/2225* (2011.01)
  *H04N 21/23* (2011.01)
  *H04N 21/262* (2011.01)
  *H04N 21/2665* (2011.01)
  *H04N 21/2747* (2011.01)
  *H04N 21/643* (2011.01)
  *H04N 21/60* (2011.01)

(52) U.S. Cl.
  CPC ... *H04N 21/26258* (2013.01); *H04N 21/2665* (2013.01); *H04N 21/2747* (2013.01); *H04N 21/64322* (2013.01); *H04N 21/60* (2013.01)

(56) References Cited

U.S. PATENT DOCUMENTS

| | | |
|---|---|---|
| 9,100,709 B1 | 8/2015 | Osminer et al. |
| 9,819,972 B1 | 11/2017 | Vantalon et al. |
| 10,200,761 B1 | 2/2019 | Christie et al. |
| 10,255,445 B1 | 4/2019 | Brinskelle |
| 2008/0052348 A1 | 2/2008 | Adler et al. |
| 2009/0249418 A1 | 10/2009 | Alastruey Gracia et al. |
| 2012/0011557 A1* | 1/2012 | Mathews ........... H04N 21/4622 348/731 |
| 2012/0036365 A1* | 2/2012 | Kyslov ........... H04N 21/47202 707/769 |
| 2012/0233640 A1 | 9/2012 | Odryna et al. |
| 2013/0117413 A1 | 5/2013 | Kaneko et al. |
| 2013/0332971 A1* | 12/2013 | Fisher ................ H04N 21/8456 725/93 |
| 2014/0059243 A1 | 2/2014 | Reisner |
| 2014/0143337 A1* | 5/2014 | McIntosh ................ H04L 61/50 709/204 |
| 2014/0165118 A1 | 6/2014 | García Mendoza et al. |
| 2014/0208360 A1 | 7/2014 | Kardatzke |
| 2014/0282787 A1 | 9/2014 | Wirick et al. |
| 2016/0094883 A1* | 3/2016 | Tidwell ................ H04N 21/812 725/109 |
| 2016/0249105 A1 | 8/2016 | Carney Landow |
| 2017/0111670 A1 | 4/2017 | Ducloux et al. |
| 2017/0171610 A1 | 6/2017 | Nair et al. |
| 2018/0063213 A1* | 3/2018 | Bevilacqua-Linn .................. H04L 41/0654 |
| 2019/0082221 A1 | 3/2019 | Jain et al. |

* cited by examiner

```
CAM VHOST CONFIG

DocumentRoot "/var/www/html"
<VirtualHost *:80>
    OPTIONS INDEXES FOLLOWSYMLINKS
    DocumentRoot /home/contra/contra/health
    RewriteEngine ON
    RewriteMap map "dbm=db :/home/contra/contra/data/map.db"
    RewriteCond {map:S1} != ""
    RewriteRule "v/([a-zA-Z0-9]*)/(.*)$" "${map:S1|notfound}/$2?"
    [R=PERMANENT, L]
</VirtualHost>
```

(R=PERMANENT; L=stop).

FIG. 3c

```
SAMPLE MAP TXT FILE

MAP.TXT -- CREATED BY JDOE 06/01/2016 11:52

991F HTTP://vlo01enwdco.co.sc.charterlab.com/webram/10179_espnhd_enwdco
AA32 HTTP://vlo01enwdco.enwd.co.sc.charterlab.com/webram/19548_hbohd
6FC1 HTTP://vlo01enwdco.enwd.co.sc.charterlab.com/webram/59368_hbo2hd
7F59 HTTP://vlo01enwdco.enwd.co.sc.charterlab.com/webram/59363_hbosghd
F141 HTTP://vlo01enwdco.enwd.co.sc.charterlab.com/webram/10977_fsno1
C316 HTTP://vlo01enwdco.enwd.co.sc.charterlab.com/webram/58452_usahd
D47C HTTP://vlo01enwdco.enwd.co.sc.charterlab.com/webram/71601_ngcphd
17A2 HTTP://vlo01enwdco.enwd.co.sc.charterlab.com/webram/46737_outhd2
3C17 HTTP://172.30.118.22/mpd1/2/NGCHD-DASHTS
14B0 HTTP://vlo01enwdco.enwd.co.sc.charterlab.com/webram/60179_fnchd
```

FIG. 3d

| FOLDER NAME | FUNCTION |
| --- | --- |
| /home/cam | CAM FOLDER (INCLUDING OPTIONAL CHROOT JAIL) |
| /home/cam/import | MAP TXT/MD5 IMPORT FOLDER (USED FOR AUTOMATIC MAP UPDATES) |
| /home/cam/scripts | CAM SCRIPT FOLDER |
| /home/cam/www | |
| /home/cam/logs | LOG FOLDER FOR IMPORT PROCESSES, ETC. (SEPARATE LOG FOR EACH PROCESS) |
| /home/cam/data | FOLDER THAT CONTAINS THE MAP.DB DATABASE USED IN ALL LOOKUPS |
| /home/cam/data_backups | CONTAINS PREVIOUS COPIES OF MAP FILES, IMPORT TXT AND MD5 FILES. |
| /home/cam/health | CONTAINS JSON FILES WRITTEN TO SUMMARIZE OPERATIONAL STATUS OF THE NODE |

FIG. 3e

APPARATUS AND METHODS FOR PACKETIZED DATA MANAGEMENT AND DELIVERY IN A DIGITAL CONTENT DISTRIBUTION NETWORK

PRIORITY

This application is a divisional of and claims priority to co-owned U.S. patent application Ser. No. 15/631,423 filed on Jun. 23, 2017 entitled "APPARATUS AND METHODS FOR PACKETIZED DATA MANAGEMENT AND DELIVERY IN A DIGITAL CONTENT DISTRIBUTION NETWORK," and issuing as U.S. Pat. No. 11,704,300 on Jul. 18, 2023, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of digital media data (e.g., text, video, and/or audio) over managed and/or unmanaged content delivery networks, and specifically in one exemplary aspect to methods and apparatus for delivery of "live" Internet Protocol (IP)-based content data in digital form to requesting network client devices (and ultimately end-user devices).

2. Description of Related Technology

The distribution of digital content (e.g., media such as television programming and music) has expanded over time to a variety of different environments and user platforms. Network operators to deliver its video products to customers using a variety of different devices, thereby enabling their users or subscribers to access content in a number of different contexts, both fixed (e.g., at their residence) and mobile (such as while traveling or away from home).

Moreover, content delivery may be specific to the network operator, such as where the content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

Alternatively via so-called "over-the-top" or OTT delivery may be used, wherein content from a third party source who may be unaffiliated with the network operator provides content directly to the requesting user or subscriber via the network operator's infrastructure, e.g., via an IP-based transport; i.e., the content is packetized and routed for delivery to the requesting user based on the user's network or IP address, such as via a high-speed DOCSIS cable modem, according to the well-known Internet Protocol network-layer protocol. IP unicasts (point to point) or multicasts (point to multiple points) have traditionally been used as the mechanism by which the OTT content is distributed over the network, via the user accessing a prescribed URL and logging in with their credentials to gain access to the content. The IP content is then streamed via the unicast/multicast to the requesting user(s), and received and decoded by a media player application program ("app") on the user's PC, laptop, or other IP-enabled end-user device.

There are many types of what could be considered "OTT" content delivery. Network operator-focused ("broadcast") OTT models typically uses subscriber ISPs (e.g., the cable MSO) to deliver OTT services. For this approach, OTT delivery may involve a tight coupling of application control, embedded securely in smart TVs or set-top boxes, and a cohesive primary content origination strategy. This typically includes a streaming video-based workflow that connects content publishing sources with the MSO content management system. This, in turn, is synchronized with the applications in the end-user or subscriber devices; content is presented in the form of an application-based electronic program guide (EPG) or other user interface on the user device.

Hence, the broadcast OTT provider's services will appear 'integrated' with traditional (e.g., linear) programming, whereas "simple streaming" third-party services such as YouTube and Netflix utilize separate applications. For example, a typical user might see YouTube, and Netflix apps as separate options on his/her "main" smart TV display menu, but would not see the integrated (broadcast OTT) content as a standalone menu application. In effect, the broadcast OTT provider's "app" is native to and tightly coupled with the other (e.g., broadcast) services provided via the IP-enabled user device.

As OTT and similar delivery mechanisms become more prevalent, network operators such as MSOs may seek to structure their network architecture so as to better support such services, in terms of inter alia, reliability/redundancy, scalability, and enhanced adaptability to new services such as cloud or network-based DVR (cDVR or nDVR) and real-time or dynamic advertising insertion (DAI).

To this end, the mechanisms for distribution of the OTT IP-based content must be considered as part of the architecture. While the foregoing IP unicast and multicast have utility, alternate mechanisms for delivery exist. For example, hypertext transport protocol (HTTP)-based streaming (e.g., HLS, MSS, HDS) may be used for OTT content delivery (e.g., tightly coupled, as described above). However, there are challenges to consider when adopting an HTTP-based delivery architecture. One primary challenge is how to identify the (internal network) location where content is stored at any given time. Video-on-demand (VOD) and cDVR/nDVR content is typically stored on a highly-redundant set of disks or SSDs, and is identified and tracked using a central management system. Contemporaneous or "live" video (such as linear broadcasts), on the other hand, has no such management system.

Particularly, in extant content management architectures such as that of FIG. 1, any number of "clients" may be requesting a given live content element that is stored on the network operator's infrastructure (or other infrastructure accessible thereto). As used in the present context, the term "client(s)" refers without limitation to processes or devices which consume or request (e.g. live) content within the managed network infrastructure for delivery to end-user devices, such as via the HFC infrastructure 101 to digital settop boxes (DSTBs) 106a or personal computers or smart TVs (the latter via e.g., a DOCSIS cable modem 106b), or IP-enabled portable devices 106c of MSO subscribers via an internetwork 111 such as the Internet (see FIG. 1).

For example, so-called "just-in-time (JIT)" packager processes 105a, 105b, 105c are such clients; they are commonly used in the network infrastructure to access stored content (e.g., live content that has previously been ingested from one or more external sources 109) and package the content along with any other associated content such as advertising content, for delivery to the requesting end-user device 106a, 106b, 106c. In particular, these devices create segmented video files that are delivered over HTTP to requesting end-user devices, the latter which then "stitch" the segments together to form a contiguous video stream, based on a manifest. Such JIT packagers may exist in significant numbers (since, as discussed infra, more subscribers requires more JIT packagers), and reside near the edge of the infrastructure (as opposed to the headend(s) 110) so as to more directly serve designated (and different) subsets of requesting users within a prescribed geographic area. This approach adds complexity to possible schemes for updating content location data, since each JIT packager in effect operates autonomously of the others.

Moreover, digitally rendered live content stored within the MSO network and requested by "clients" such as the aforementioned JIT packagers 105a, 105b, 105c may be both: (i) stored at multiple, possibly geographically and/or (network) topologically disparate locations, such as behind origin servers (OS) 120a, 120b, 120c; and/or (ii) split among two or more storage locations (e.g., parts of a given content asset such as an NFL football game may exist in two or more storage locations).

Additionally, such content may be stored on the network within heterogeneous types of storage architectures and/or encoding formats. For example, when delivering HTTP streams, two options are commonly used for content asset storage: (i) the assets are stored in an HTTP-ready format, so that "clients" can make HTTP requests for video segments directly (e.g., from an HTTP server); or (ii) the content assets can be stored in a canonical (or mezzanine) format which is subsequently converted to HTTP-rendered segments in a JIT fashion (i.e., upon request from a client). The HTTP format storage (i) is generally more storage intensive, while the canonical/mezzanine option (ii) is more computationally (silicon) intensive.

Further, the foregoing extant infrastructure does not scale well in terms of keeping each client process updated; i.e., as the number of content assets and JIT packagers (or other client processes) increase, the system can be rapidly overwhelmed, since each JIT content delivery request may arguably be unique. In operation, end-user devices 106 that request a content stream from the JIT packager first receive a manifest describing the available content "profiles" (i.e., bitrates, resolutions, etc.). The JIT packager creates the manifest when it is requested. End user devices subsequently request specific chunks of content from the JIT packager, which extracts the requested chunks from the stored mezzanine files, and delivers them to the requesting end-user device(s). Thus, each end-user device request is served from the JIT packager—the more subscribers that exist, the more JIT capacity is needed (and the more capacity is needed for maintaining each JIT packager updated for assets across the entire MSO infrastructure).

Currently, no satisfactory mechanism exists to provide for the effective distribution of content asset storage location data to JIT packagers and other client processes within the MSO network. Moreover, to continually update each of the multiple JIT packager processes 105a, 105b, 105c (which themselves may be at disparate locations) on the current content storage locations (and other relevant data) for each live content element ingested by the MSO network can become burdensome to the network operator, and impractical or even impossible given a large enough number of JIT processes and content assets and subscribers. At very least, additional complexity and latency in servicing end-user content requests result from attempting to manage live content assets as in the prior art paradigm discussed above.

Hence, improved methods and apparatus are needed for managing, inter alia, live content distributed via the content network, so as to reduce complexity. Such improved methods and apparatus would ideally: (i) utilize extant infrastructure to the maximum extent practicable, thereby obviating extensive customization or reconfiguration of network hardware and software (i.e., capital expenditures); (ii) be scalable so as to account for changes in demand, service area coverage, and/or number of subscribers; and (iii) be readily extensible to future technologies, including network-based, user-specific storage models.

SUMMARY

The present disclosure addresses the foregoing needs by providing, inter alia, methods and apparatus for implementing streamlined and effective management of stored content assets in support of client requests such as for example those issued by JIT packager processes within a content delivery network.

In one aspect of the disclosure, a digital content manager apparatus is disclosed. In one embodiment, the manager apparatus includes: a first interface configured to at least communicate with a plurality of network-based client processes; a processor apparatus in data communication with the first interface; and a storage apparatus in data communication with the processor apparatus and comprising at least one computer program.

In one variant, the at least one computer program includes a plurality of instructions which are configured to, when executed by the processor apparatus, cause the digital content manager apparatus to: receive a request for digitally rendered content element from one of the plurality of network-based client processes, the request comprising at least first data; based at least on the first data, access a database to obtain location data associated with at least a portion of the requested digitally rendered content element, the location data indicative of at least one network storage location of the at least portion of the digitally rendered content element; based at least on the accessed location data, generate a protocol-based message for transmission to the requesting one network-based client process; and cause transmission of the protocol-based message to the requesting one network-based client process, the protocol-based message configured to enable the requesting one network-based client process to access at least the portion of the requested digitally rendered content element at the at least one network storage location.

In one particular implementation, a protocol associated with the protocol-based message comprises an extant protocol used within the content delivery network for other functions, the extant protocol comprising a stateless protocol such as the hypertext transport protocol (HTTP), and the protocol-based message is e.g., an HTTP 301 message.

In another implementation, the requesting one network-based client process comprises a just-in-time (JIT) packaging process having prescribed timing requirements, and the transmission of the protocol-based message is configured to be conducted to meet the prescribed timing requirements.

In a further implementation, the plurality of network-based client processes comprise: (i) at least one a just-in-time (JIT) packaging process; and (ii) at least one cloud Digital Video Recorder (cDVR) apparatus.

In another implementation, the first data comprises an abbreviated or truncated designation for the requested content element, and the location data comprises one or more universal resource locators (URLs) associated with the network storage location, the network storage location accessible via one or more origin servers.

In yet another implementation, the request comprises second data relating to one or more path parameters associated with the requested content element; and the generation of the protocol-based message comprises inclusion of at least a portion of the second data in the protocol-based message.

In another implementation, the digital content manager apparatus is disposed within a first topological zone of the content delivery network; the plurality of network-based client processes are disposed in a second, different topological zone; and the at least one computer program further comprises a plurality of instructions configured to, when executed by the processor apparatus, maintain a topologically local database, the database at least correlating first data with location data for a plurality of digitally rendered content elements each accessible by each of the plurality of network-based client processes. The disposition of the digital content manager apparatus in the first zone allows, inter alia, a single instance of the digital content manager apparatus to service content element requests from the plurality of network-based client processes using at least the local database. The first topological zone of the content delivery network may be e.g., a headend portion of a managed content distribution network, and the second, different topological zone an edge or hub portion of the managed content distribution network. The plurality of network-based client processes are each configured to receive respective requests for delivery of digitally rendered content elements from a plurality of end-user devices, the plurality of end-user devices each disposed in a third portion of the content delivery network such as an untrusted internetwork not part of the managed content distribution network.

In another aspect, a method of processing digital content requests issued from respective ones of a plurality network-based content provision processes is disclosed. In one embodiment, the method includes: receiving, at a centralized network function, respective requests for respective digitally rendered content elements, the requests issued from respective ones of a plurality network-based content provision processes; processing each of the respective requests using the centralized network function to extract respective ones of data identifiers associated with the respective digitally rendered content elements; utilizing the extracted respective ones of data identifiers to access a database to cross-reference the data identifiers with location data for the respective digitally rendered content elements; and generating respective messages for transmission to the respective content provision processes including the respective cross-referenced location data, the respective messages configured to enable each of the respective plurality network-based content provision processes to utilize their respective location data to redirect to one or more network locations where the respective digitally rendered content elements can be accessed.

In one variant, the method further includes issuing, using at least respective ones of the plurality network-based content provision processes, the respective requests for the respective digitally rendered content elements responsive to receiving respective ones of requests from one or more content delivery network caches, the one or more caches associated with one or more untrusted public internetworks, the one or more caches in data communication with a plurality of end-user devices.

In another variant, the plurality network-based content provision processes comprise a plurality of just-in-time (JIT) packager processes each having a prescribed time or latency constraint, and the method is performed to allow the provision of the respective digitally rendered content elements to respective requesting end-user device with the respective prescribed time or latency constraints.

In a further variant, the receiving respective requests for respective digitally rendered content elements comprises receiving respective requests for live or linear digitally rendered content during original transmission or broadcast thereof, and the redirection is performed substantially in real time.

In yet another variant, the method further includes issuing, using at least respective ones of the plurality network-based content provision processes, the respective requests for the respective digitally rendered content elements, the issuing comprising using at least one algorithmic computerized process to truncate or convert respective first network addresses associated with the respective digitally rendered content elements to respective network-specific identifier (ID) values, the ID values shorter in character or bit length than their respective first network addresses, such as via e.g., a modification/rewrite software engine to convert the respective first network address to the respective network-specific identifier (ID) values having a prescribed length.

In another aspect, a network architecture for use in a managed content distribution network is disclosed. In one embodiment, the architecture is configured to alleviate a plurality of network-based client content provision processes from having to maintain or update digital content element storage location data through use of one or more unified content management processes, and includes: a plurality of network-based client content provision processes; at least one computerized content management process in data communication with the plurality of network-based client content provision processes via a prescribed computer protocol; and at least one database in data communication with the at least one computerized content management process, the at least one database comprising a plurality of data structures configured to relate a plurality of network-specific identifier values to respective one or more network addresses where respective digital content elements can be accessed by the plurality of network-based client content provision processes.

In one variant, the at least one computerized content management process further comprises computerized logic configured to, when executed: receive respective requests from the plurality of network-based client content provision processes, the requests each received using at least the prescribed computer protocol, the requests each: (i) addressed to the at least one computerized content management process; and (ii) containing a respective one of the plurality of network-specific identifier values; access the at least one database to obtain the respective one or more network addresses where the respective digital content elements can be accessed; and generate respective messages using the prescribed computer protocol to the respective ones of the plurality of network-based client content provision processes, the messages each configured to cause the respective ones of the plurality of network-based client content provision processes to redirect to the respective one or more network addresses where the respective digital content elements can be accessed.

In another variant, the at least one at least one computerized content management process comprises a plurality of computerized content management process each in data communication with each of the plurality of network-based client content provision processes, and the architecture is configured such that of the plurality of network-based client content provision processes can access each of the plurality of computerized content management process to obtain access to an identical one of the digital content elements. In one implementation, the network architecture further includes computerized management logic in data communication with each of the plurality of computerized content management processes and with each of the plurality of network-based client content provision processes. The computerized management logic is configured to cause individual ones of the plurality of network-based client content provision processes to access only one or more unaffected ones of the plurality of computerized content management processes in the event of a failure of one or more of the plurality of computerized content management processes.

In another implementation, the prescribed computer protocol comprises a stateless protocol, the configuration such that of the plurality of network-based client content provision processes can access each of the plurality of computerized content management process to obtain access to an identical one of the digital content elements being enabled at least in part by the stateless protocol.

In a further aspect, a non-transitory computer readable apparatus is disclosed. In one embodiment, the apparatus includes a storage medium having one or more computer programs disposed thereon. The one or more programs are configured to, when executed on a processing device, implement content request redirection functionality within a managed content distribution network.

In a further aspect, a packager apparatus is disclosed. In one embodiment, the packager apparatus includes: a first interface configured to communicate with a network; a storage apparatus; and a processor apparatus configured to execute at least one computer program, the at least one computer program comprising a plurality of instructions. In one variant, the instructions are configured to, when executed, cause the apparatus to: receive a request for a digital content element from an end-user device (or intermediary), and generate a protocol-based request to a designated content management process including a truncated or shortened ID value embedded within a URL.

In yet another aspect, an application programming interface (API) is disclosed. In one embodiment, the API is configured to run on the content management apparatus, and be accessed by "client" processes such as JIT packagers and could recording manager processes to obtain updated content storage locations for digital content requested by end-user equipment such as mobile IP-enabled devices via at least an unmanaged internetwork.

In another aspect, a method of reducing latency for digital content provision is disclosed. In one embodiment, the method includes utilizing a content ID value directed to a common content management process serving a plurality of network-based clients, the content manager maintaining a unified and updated resource for ID-to-URL correlation, thereby obviating delays associated with multiple redirects or errors.

These and other aspects shall become apparent when considered in light of the disclosure provided herein.

BRIEF DESCRIPTION OF THE DRAWINGS

FIG. 3b is a functional block diagram illustrating exemplary messaging between the entities of FIGS. 3 and 3a.

FIG. 3c is a listing of code implementing an exemplary "rewrite" operation for short ID data to DBM URL data for use by a requesting client process.

FIG. 3d illustrates and exemplary text-based map file structure according to one implementation.

FIG. 3e illustrates one exemplary directory structure for use by a CAM node according to the present disclosure.

Figure 1:
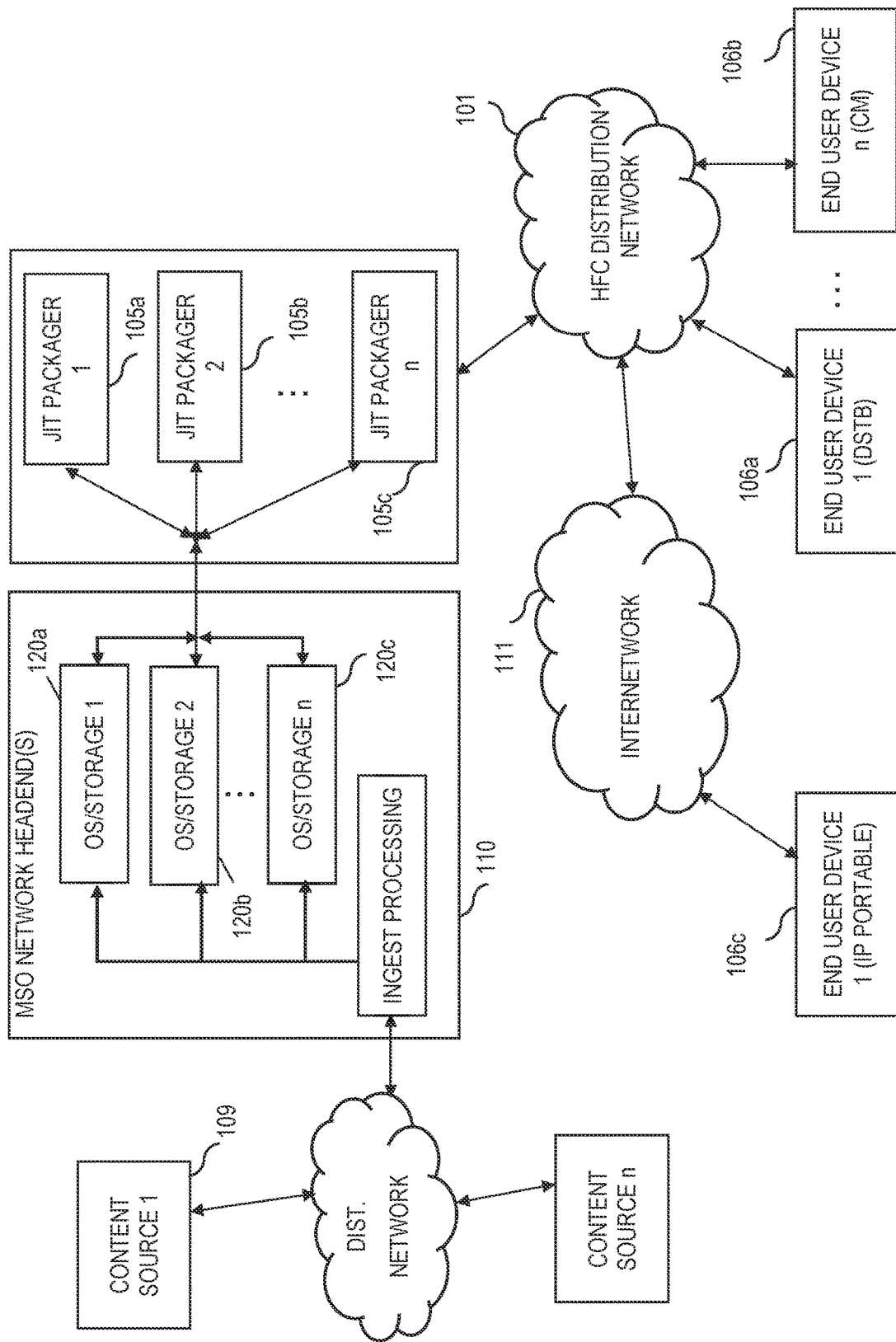
FIG. 1 is a high-level functional block diagram illustrating a typical prior art "live" content distribution system associated with a managed content network.

All Figures© Copyright 2017 Charter Communications, Inc. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could include a downloadable Java Xlet™ that runs within the JavaTV™ environment.

As used herein, the term "end user device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, Smart TVs, USB-based devices, and vehicle infotainment or navigation systems.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (Real-Video, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "DASH" refers without limitation to ISO MPEG 23009-1 Information technology—Dynamic adaptive streaming over HTTP (DASH)—Part 1: Media presentation description and segment formats, incorporated herein by reference in its entirety.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "DOCSIS" refers to any of the existing or planned variants of the Data Over Cable Services Interface Specification, including for example DOCSIS versions 1.0, 1.1, 2.0, 3.0, and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnetTM), radio frequency tuner (e.g., in-band or OOB, cable modem, etc.), Wi-Fi (802.11, Wi-Fi Direct, etc.), LTE/LTE-A, WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information, whether local, virtual, or cloud-based.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one aspect, apparatus useful for the management of requests for stored content assets by network processes such as JIT packagers or network recorder functions (e.g., cDVR or nPVRs) is disclosed. In one exemplary embodiment, the apparatus is configured to utilize extant network protocols in conjunction with a "virtual" client reference (e.g., a "short ID" or URL) sent to a designated location within the network, the latter which is configured to redirect content requests to one or more origin servers to provide the requesting network process with the stored content assets. In one implementation, a multiplicity of heterogeneous requesting network processes (e.g., JIT packagers) utilize a common content redirection management entity (i.e., a Content API Manager or "CAM") via existing protocols that have been "repurposed" for content location redirection (e.g., ubiquitous HTTP "301" messages), thereby obviating both (i) updating complex content location mappings at each network process, and (ii) extensive customization of hardware or software.

For example, under prior art approaches, where multiple JIT packagers are used to access content internally for end-user device playout, many JIT source "patterns" are needed in order to support all known content origin locations. In contrast, a single origin source pattern may be used for all such JIT servers using the exemplary implementations of the methods and apparatus of the present disclosure.

Likewise, if a JIT server cluster is "fronted" with a content delivery network (CDN), only one external prefix is needed (as opposed to many under the prior art approaches).

Yet further, if a digital content asset needs to be moved internally from one storage location to another, only a single point (versus all network client processes) need be updated to reflect a change in the asset location. Using the inventive architecture and methods described herein, such updated content locations can be discovered at the point of request, with no requirement in having a back-office application re-send content URL's (or attendant delays associated therewith).

Moreover, in the event of a channel/group/site failover or incipient maintenance requirement, content URLs can be changed quickly to re-direct clients to the designated backup site(s), thereby providing enhanced flexibility to operational processes and/or personnel to implement changes with no need to send URL or other updates to other processes/personnel within the managed network infrastructure.

The disclosed methods and apparatus also provide benefits in terms of enhanced security, and extensibility to future platforms or types of client processes, some of which may operate in a markedly different fashion that extant JIT packagers or cDVR apparatus.

The aforementioned CAM is also advantageously "client agnostic"; i.e., a protocol (e.g., HTTP GET) request is a protocol request, regardless of whether sourced from a JIT packager process, cDVR apparatus, or other network entity. Hence, any network entity can make an HTTP-based API "call" to a CAM to obtain content location/redirection data.
Detailed Description of Exemplary Embodiments Exemplary embodiments of the apparatus and methods of the present disclosure are now described in detail. While these exemplary embodiments are described in the context of a managed network (e.g., hybrid fiber coax (HFC) cable) architecture having a multiple systems operator (MSO), digital networking capability, IP-based content delivery capability (including e.g., via unmanaged internetworks such as the Internet), and a plurality of end-user devices, the general principles and advantages of the disclosure may be extended to other types of networks and architectures that are configured to deliver digital media data (e.g., text, video, and/or audio), whether managed or unmanaged. Such other networks or architectures may be broadband, narrowband, wired or wireless, or otherwise.

It will also be appreciated that while described generally in the context of a network providing service to a customer or consumer (e.g., residential) end user domain, the present disclosure may be readily adapted to other types of environments including, e.g., commercial/enterprise and government/military applications. Myriad other applications are possible.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

In addition, while the disclosure refers at numerous points to one or more Internet or OTT embodiments, the principles of the disclosure are contemplated in other applications, such as e.g., network visual communications (i.e., Skype®, Facetime®, and/or other), or cloud computing/storage/streaming services. All such embodiments are considered disclosed herein.

Other features and advantages of the present disclosure will immediately be recognized by persons of ordinary skill in the art with reference to the attached drawings and detailed description of exemplary embodiments as given below.
Network Architecture—

Figure 2:
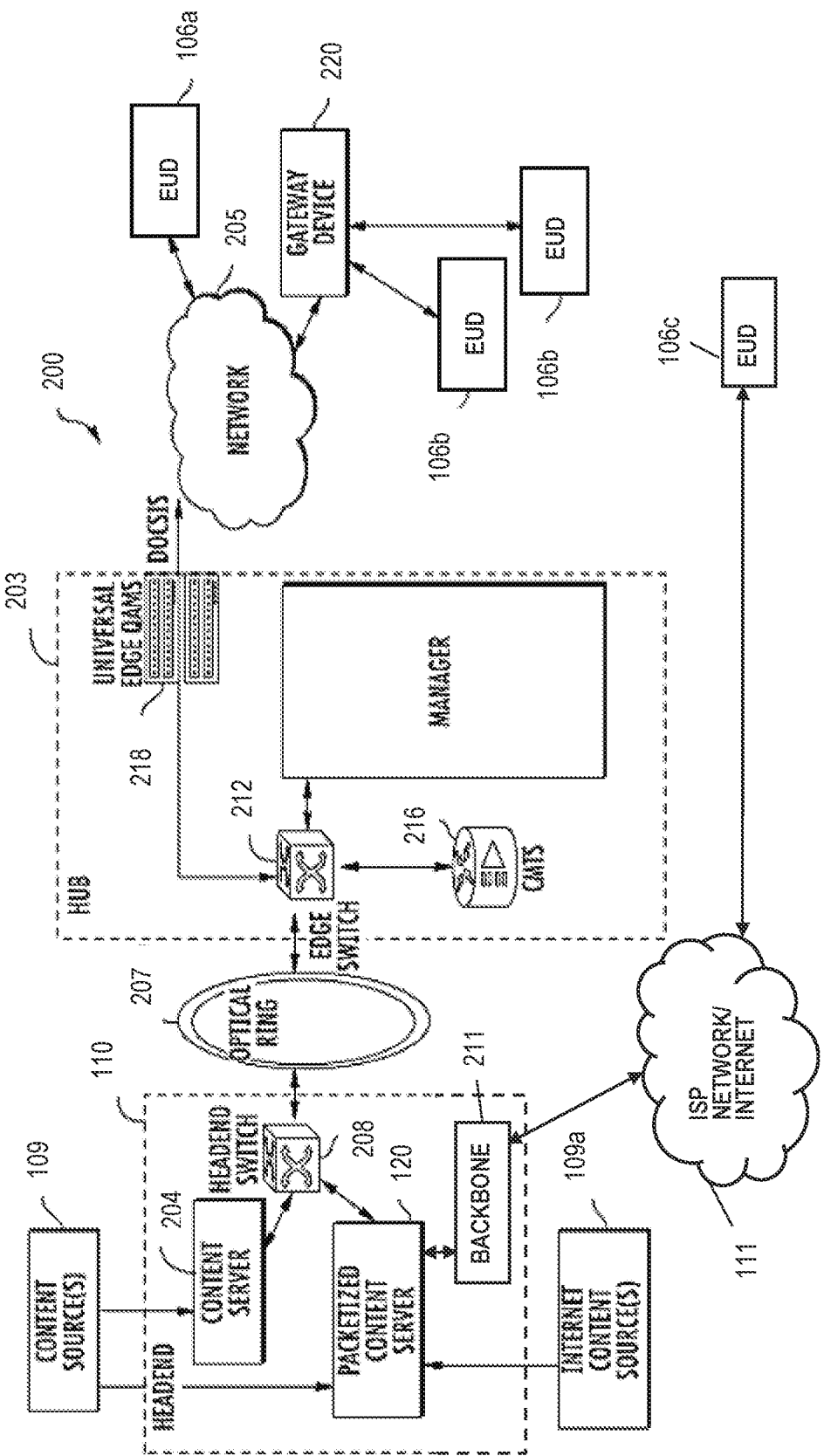
FIG. 2 is a functional block diagram of an exemplary packetized content network architecture useful in conjunction with various principles described herein.

FIG. 2 illustrates an exemplary high-level network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 2 may deliver Internet data and OTT services via the Internet protocol (IP) and TCP, although other protocols and transport mechanisms of the type well known in the digital communication art may be substituted.

The network 200 generally comprises a managed content distribution network having one or more headends 110 in communication with at least one hub 203 via an optical ring 207. The distribution hub 203 is able to provide content to various user devices, client devices 106, and gateway devices 220 as applicable, via an interposed network infrastructure 205. The gateway 220 may be wired and/or wireless, such as e.g., a Wi-Fi compliant access point (or AP, not shown), or even a cellular data system such as an LTE/LTE-A based system.

As described in greater detail below, various content sources 109, 109a are used to provide content to content servers 204 an origin servers 120. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 109a (such as e.g., a web server) provide Internet content to a packetized content origin server(s) 120. Other IP content may also be received at the origin server(s) 120, such as voice over IP (VoIP) and/or IPTV content. Content may also be received from subscriber and non-subscriber devices (e.g., a PC or smartphone-originated user made video).

The centralized media server(s) 120, 204 located in the headend 110 may also be replaced with or used in tandem with (e.g., as a backup) to hub media servers (not shown) in one alternative configuration. By distributing the servers to the hub stations 203, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 120, 204 may either be single-purpose/dedicated (e.g., where a given server is dedicated only to servicing certain types of requests), or alternatively multi-purpose (e.g., where a given server is capable of servicing requests from different sources).

The network 200 of FIG. 2 may further include a legacy multiplexer/encrypter/modulator (MEM; not shown). In the present context, the content server 204 and packetized content server 206 may be coupled via a LAN to a headend switching device 208 such as an 802.3z Gigabit Ethernet (or "10G") device. For downstream delivery via the MSO infrastructure (i.e., QAMs), video and audio content is multiplexed at the headend 110 and transmitted to the edge switch device 212 (which may also comprise an 802.3z Gigabit Ethernet device) via the optical ring 207.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem. Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems and associated end-user devices 106a, 106b of the implementation of FIG. 2 may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 216. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 218. According to this embodiment, all of the content is delivered on DOCSIS channels, which are received by a premises gateway 220 and distributed to one or more client devices 106a, 106b in communication therewith. Alternatively, the client devices 106a may be configured to receive IP content directly without need of the gateway or other intermediary.

In parallel with (or in place of) the foregoing delivery mechanisms, the MSO backbone 211 and other network components can be used to deliver packetized content to the user's mobile end-user device (EUD) 106c via non-MSO networks. For example, the previously described "OTT" content (whether tightly coupled or otherwise) can be ingested, stored within the MSO's network infrastructure, and delivered to the user's mobile end-user device via an interposed ISP (Internet Service Provider) network and public Internet 111 (e.g., at a local coffee shop, via a Wi-Fi AP connected to the coffee shop's ISP via a modem, with the user's IP-enabled end-user device 106c utilizing an Internet browser or MSO/third-party app to stream content according to an HTTP-based approach), as now described in greater detail with respect to FIG. 2a.

Network Architecture for Recording and Distributing IP-Based Content—

Figure 2A:
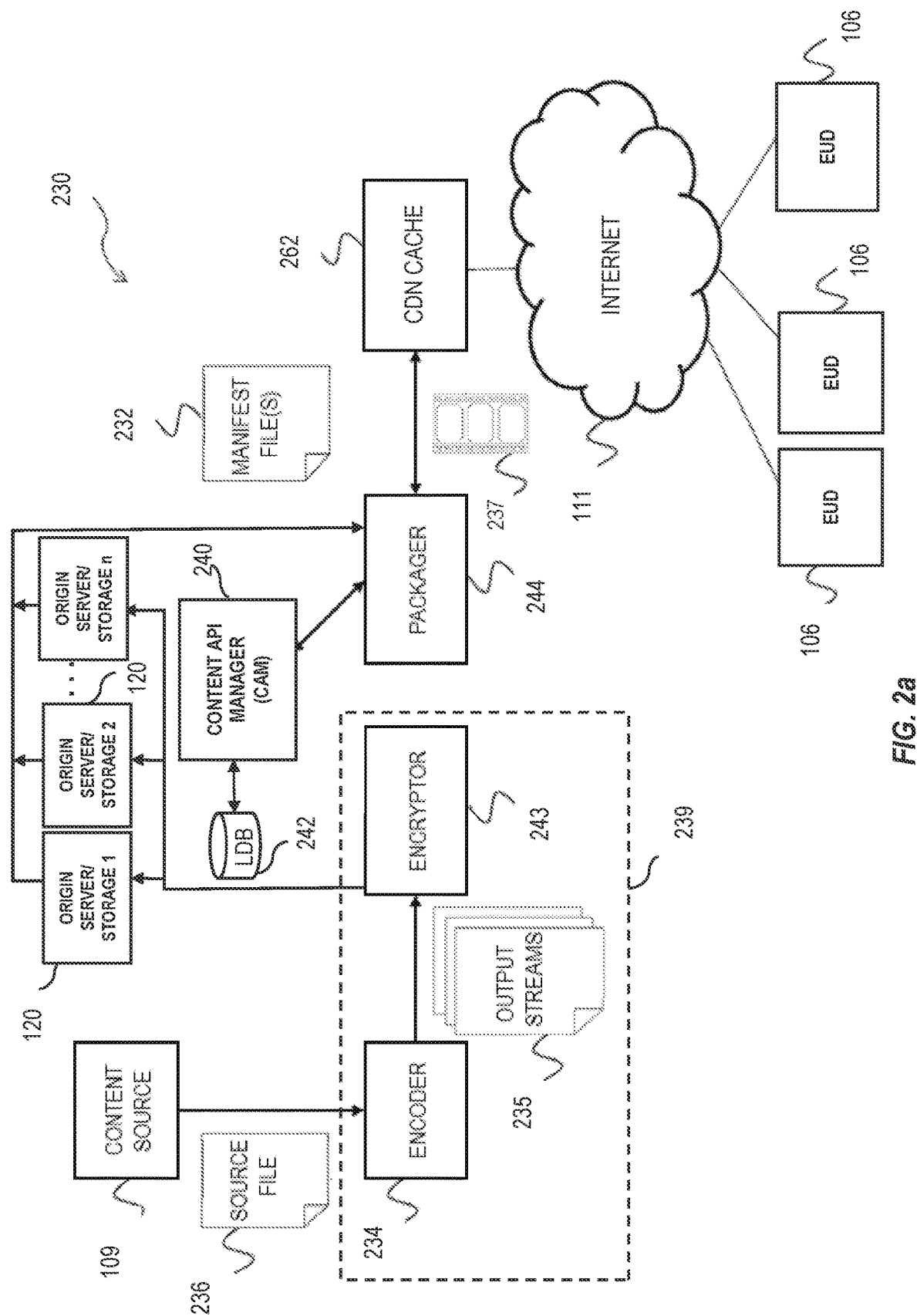
FIG. 2a is a functional block diagram of one implementation of the content ingestion, storage, and access functions of the packetized content network architecture of FIG. 2, including the disclosed content locations/redirection management functions.

FIG. 2a discloses an exemplary configuration of an architecture 230 for providing video or other media content to end-user devices 106 via a content delivery network (CDN) cache 262 and network 111; e.g., the Internet. While described in the context of an Internet Protocol (IP) network, it will be recognized that the principles of the disclosure may be extended to other transport modalities and network paradigms.

The requesting EUD 106 may include DSTBs, CMs, home gateway devices and/or IP-based devices. Common examples of such IP-based devices include, without limitation, tablets, phablets, smart phones, smart televisions (TVs), desktop and laptop personal computers (PC), and portable media players.

In one embodiment of the present disclosure, an encoder 234 encodes a source file 236 from a content source 109 into at least one encoding format (e.g., transcodes a source file from one format to at least one other format). In another variant, the source file 236 is encoded into a plurality of encodings that correspond to a respective plurality of one or more device types, codecs, resolutions, file formats, audio encodings, bit rates, etc.

As a brief aside, there are numerous video coding methods that compress digital video content. Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards. The MPEG-4 Advanced Video Coding (AVC) standard (also known as MPEG-4, Part 10) is a newer standard jointly developed by the International Organization for Standardization (ISO) and ITU-T. The MPEG-4 AVC standard is published as ITU-T H.264 and ISO/IEC 14496-10. For purposes of clarity, MPEG-4 AVC is referred to herein as H.264.

Hence, in one implementation of the architecture 230 of FIG. 2a, the packager 224 (and CDN cache 262) are configured to utilize a variety of encodings of the foregoing types, so as to, inter alia, increase flexibility of delivery to various types of end-user platforms (i.e., having heterogeneous decode capabilities), such as via adaptive bitrate (ABR) streaming techniques. Adaptive bitrate (ABR) streaming, as the name implies, enables use of multiple bitrates of a particular piece of content for stream to a given viewer, the selection of the bit rate being based on e.g., current network conditions. This means that when there is greater bandwidth availability, a larger bitrate version of the content may be selected. If available bandwidth narrows, a lower bitrate (i.e., smaller) version of the content may be selected to provide a seamless user experience. Non-limiting examples of ABR streaming include, without limitation, MPEG-Dynamic Adaptive Streaming over HTTP (DASH), Adobe® Dynamic Streaming for flash, Apple® HTTP Adaptive Streaming, Microsoft® Smooth Streaming, QuavStreams® Adaptive Streaming over HTTP, and upLynk®.

It will be appreciated, however, that the techniques described herein may be used with systems that utilize CBR (constant bitrate) or other type of streaming, as well as ABR.

Returning again to FIG. 2a, a source file 236 from a content source 109 is input to the encoder 234. Various content sources 109 may provide source files to the encoder 234. For example, content may be received from a local, regional, or network content library as discussed in co-owned U.S. Pat. No. 8,997,136 previously incorporated herein. Alternatively, content may be received from linear analog or digital feeds, as well as third party content sources. Internet content sources (such as e.g., a web server) may also provide Internet content to the encoder 234. In yet another embodiment, content may be received from subscriber and/or non-subscriber devices (e.g., a PC or smartphone-originated user made video).

The source file 236 may be encoded in a variety of formats (both audio and video), bit rates, resolutions, which are each playable on a variety of devices. Accordingly, one or more output streams 235 are produced by the encoder 234. For example, a content delivery network may enable a wide variety of user devices to play a certain piece of content. Accordingly, a network operator selects to have the encoder 234 encode the content into multiple formats for use on the variety of players. In a further embodiment, a network operator selects to utilize adaptive bitrate streaming such that multiple bit rate streams are utilized by selecting an optimized stream from the output streams 235, e.g., the stream that best utilizes the viewer's device and current bandwidth constraints to provide an optimal playback experience. In one implementation, the optimization occurs via a process or application running at the encoder 234.

Parameters used by the encoder 234 to encode the source file 236 may include: (i) whether the output streams should be encoded into separate video and audio only tracks, or video tracks with audio included, (ii) an appropriate key frame period, (iii) a frame rate, (iv) segmentation duration, (v) video resolutions, (vi) video bitrate, (vii) audio bit rate (where necessary), (viii) audio sample rate, (ix) a number of audio channels, (x) aspect ratio, (xi) video codec, (xii) specific device profiles, (xiii) audio volume, (xiv) file type and extension, and (xv) standard specific encoding profiles. Standard specific encoding profiles include e.g., H.264, which includes different standard encoding profiles for baseline, main, and high encoding. Additionally, the encoder 234 may utilize information used for cutting out other resolutions/aspect ratios from a higher resolution/different aspect ratio file. For example, the encoder 234 may center-punch a standard definition (SD) image or video from a high definition (HD) source. Similarly, an HD image or video may be center punched from a 4K, 8K, 16K source.

While the output streams 235 are shown as separate files (for example MPEG 4 transport stream (.ts) files), in a further embodiment of the present disclosure, all of the streams (i.e., streams 235) are presented in a single "super" file. Having a single comprehensive file comprising multiple streams will lower the number of files the CDN/CDN cache 262 must manage. A content curator would only have to manage the single file. The CMS only has to represent the single file. And the operator only would have to confirm the existence of the single file.

The encoder 234 may encode output streams with audio tracks (e.g., AC3 audio). Different encoding formats and bit rates may be selected based on the requirements of the stream, end user equipment, and the protocols and formats used by the consuming CDN.

The encoded output streams 235 are encrypted by an encryptor 243 via an encryption algorithm (e.g., AES, DES, public key encryption, etc.). The encoded and encrypted output streams are stored in one or more storage devices associated with the origin server(s) 120. In one embodiment, the functionality of both the encoder 202 and the encryptor 243 may be integrated into a single apparatus 239 as shown.

The stored output streams are utilized by the packager 244 (e.g., a JIT packager as previously described) to provide a manifest (or index/playlist) file 232 and video segments 237 to a requesting EUD 106. Specifically, the manifest file 232 is a data structure comprising a listing of addresses for each of the video segments of a stream of data, and includes information about the video segments such as bitrates, closed captioning, audio, etc. Different ABR models may use different manifest files 232. For example, with HTTP Smooth Streaming (HSS), each of the components (closed captioning, audio, etc.) is in separate files with addresses for each in the manifest file 232. With HTTP Live Streaming (HLS), audio is embedded in the segments 237 and thus are not separately listed in the manifest file 232.

As described in greater detail below with respect to FIGS. 3-3b, the exemplary configuration of the manifest file ultimately sent to the requesting EUD 106 is populated with data (e.g., URLs) obtained from the CAM 240 as part of the "short ID" lookup within the local content database 242. In effect, the CAM/local DB act as a single point of contact for all client processes such as JIT packagers 244 and cDVR apparatus (not shown) within the network; data contained in the local DB 242 is automatically updated for content locations (see discussion of FIG. 5 below), thereby obviating having to update each client process (JITP or cDVR) individually.

Returning to FIG. 2a, the manifest file 232 may also include metadata, and a listing of media segment entries. Metadata refers to information used by a client device to interpret or otherwise manage the media segments (metadata is also colloquially referred to as "data regarding data" or "data relating to data"). Common examples of metadata include e.g., version information, protocol, file formats, supported codecs, resolution, encryption, temporal information (transmission time, time of presentation, time stamps, etc.), geographic information (restricted locations, locations for presentation, etc.), content type indicia, synchronization information, control data, etc. Stated differently, the metadata describes the media segments and can be used as a reference file when assessing or otherwise making use of the media segments 237.

In one implementation, the list of media segment entries in the manifest file 232 comprises a list of network addresses (which may be remote or local) where the corresponding segments of media content may be accessed and/or downloaded. For instance, each of the media segment entries may be listed by a Uniform Resource Locator (URL). In some embodiments, the entries may be in computing resource "path" format. Computing paths may be either absolute (i.e., the path provides the fully elaborated and unique location of the segment in a file structure) or relative (i.e., the path provides a relative location of the segment in a file structure). Additionally, in some embodiments, the entries may be in symbolic format, such that at least a portion of the entry must be further interpreted (i.e., is not human-readable). Common examples of this may include e.g., HyperText Markup Language (HTML) tags, proprietary tags, Java, Javascript, etc. Moreover, some implementations may substitute or intermingle any of the foregoing techniques to flexibly accommodate various operational models.

In another embodiment, the service provider or MSO is represented as a single logical entity (a single network domain) represented by a characteristic URL (e.g., www.charter.com). In other embodiments, the service provider may be a conglomeration of multiple logical entities. Multiple logical entities may be useful to further distribute services over various network resources or enable additional features provided by partnered corporations or providers. Multiple logical entities, for example, may provide local content for a particular service group or geographic area. Furthermore, having content providing entities closer to end users may offer lower latency and may add network redundancy. Common examples of network resources include e.g., broadcast, multicast, video-on-demand, advertisement services, local services, etc.

In the exemplary embodiment, each media segment 237 is an encoded and encrypted subsection or segment of media content. The media segments 237, when decrypted, decoded, and played in the appropriate order, render the original media content. In one implementation, each media segment 237 represents a portion of video associated with a specific resolution, codec, and time stamp. The media segments 237 are assembled according to a time stamp sequence.

In another embodiment, non-time-based segments may be used in the manifest file 232. For example, playback may occur according to the context of the sequence and not because of any implied meaning of the filename, or time stamp value. The true duration of a video segment is based on its contents and its presentation time stamp (PTS), which may not be represented in the manifest file 232. The sequence of the next media file listed in the manifest file is simply what comes next. Specifically, any schema could be used for the transport stream files in the manifest file, including 1.ts, 2.ts, 3.ts, etc., or A.ts, B.ts, C.ts.

In one exemplary implementation, the manifest files 232 are generated based on the specific device and requirements of an end user device (EUD). For example, the Microsoft® Xbox® 360 and Xbox® One video game systems require different manifest files 220 to operate. Furthermore, different streaming standards may require different manifest files 232 to operate. For example, the MPEG-Dynamic Adaptive Streaming over Hyper Text Transfer Protocol (DASH) protocol may be implemented differently with respect to Hyper Text Transfer Protocol (HTTP) live streaming and Windows® Media Streaming. Thus, each may require different manifest files 232.

In one embodiment, the local database is populated and updated from an internal content management and tracking system maintained by the network operator (e.g., MSO), such as the exemplary Safehouse system. This approach advantageously allows, inter alia, the CAM(s) 240 to automatically update their respective local database(s) from a centralized location, thereby also maintaining uniformity between the different instances of the database(s). It will be appreciated, however, that other architectures and approaches may be used consistent with the present disclosure. For instance, URL data relating to live assets can be "pushed" to each CAM 240 by the centralized management process upon occurrence of a prescribed event (e.g., ingestion or storage of the asset, at a prescribed periodicity, etc.) if desired. Such pushed data can then be cached at each CAM if needed until an update of the database 242 (as described below) is performed. Alternatively, each CAM can poll designated storage entities for the URL data relating to the desired content (e.g., live assets stored thereon, as identified by e.g., storage location or a prescribed designator indicating that type of content) on an event-driven or periodic basis. Other approaches may be used as well.

Methods—

Figure 3:
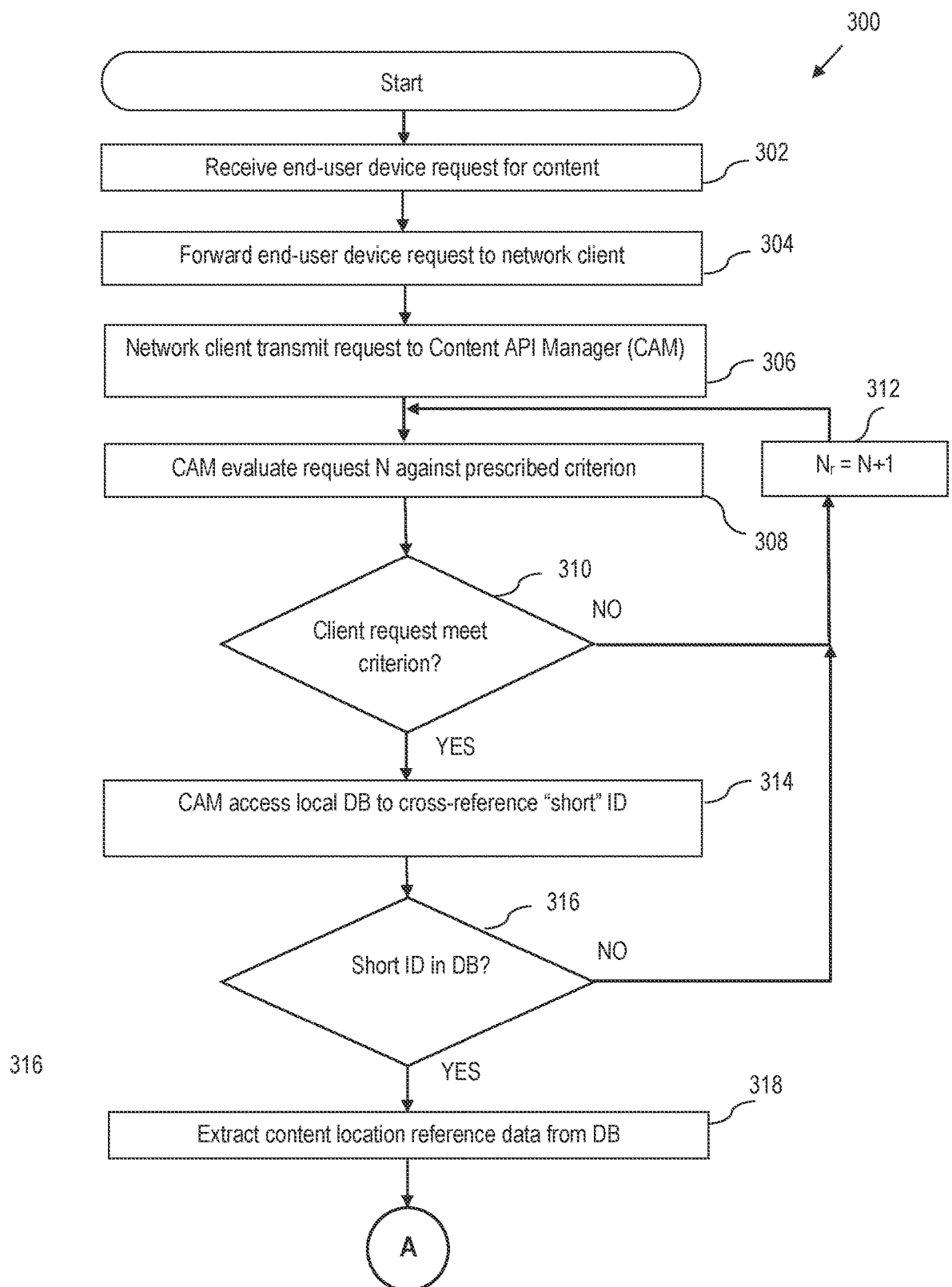
FIG. 3 is a logical flow diagram representing one embodiment of a method for processing an end-user device content request according to the present disclosure.
Figure 3:
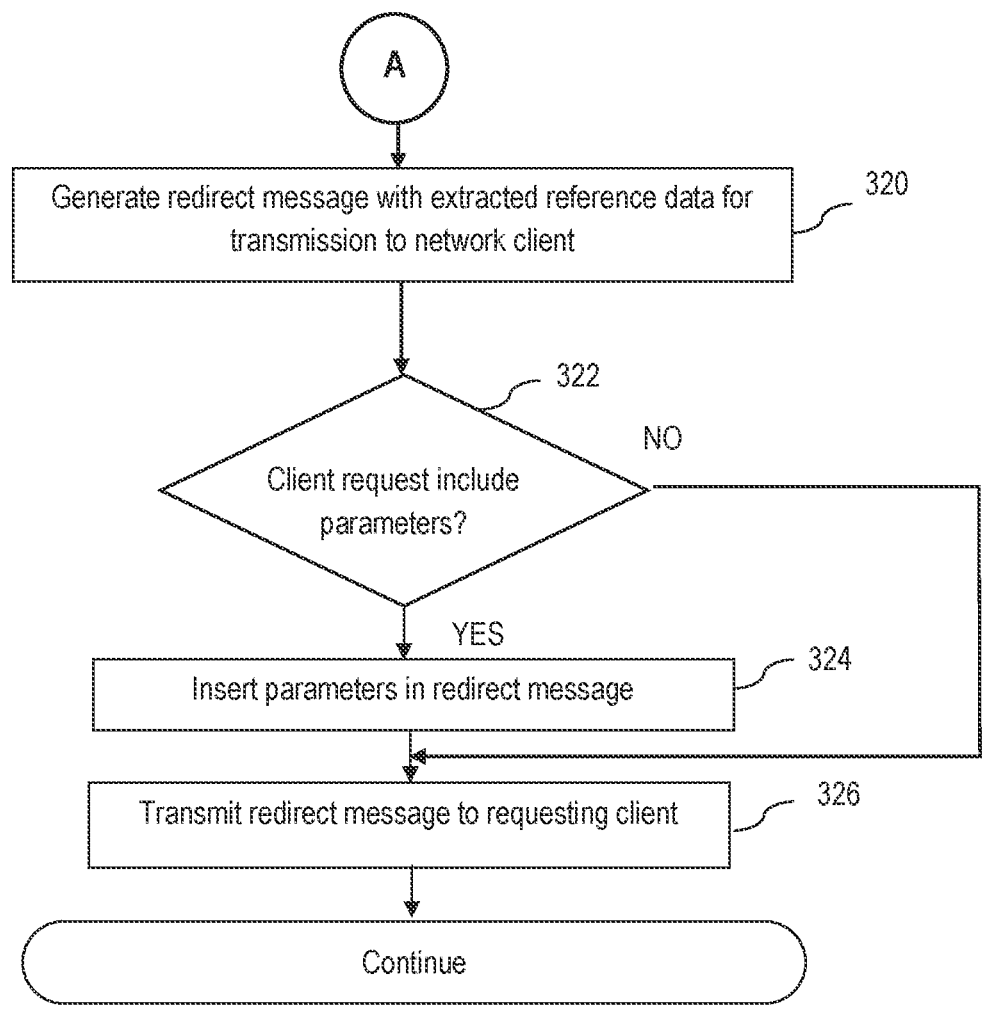

Referring now to FIG. 3, one embodiment of the generalized methodology for processing an end-user device (EUD) content request according to the present disclosure is described.

As shown, the method 300 includes first receiving an end-user device (EUD) 106c initiated request for content, such as via a user operating the EUD selecting a link or listing in an app or EPG for the desired content element, per step 302. In the exemplary embodiment, the request relates to "live" content which has been previously ingested and stored on one or more network asset storage locations, such as the origin servers 120 of FIGS. 2-2a. The request may include for example an HTTP streaming content "GET" request issued by the protocol stack of the requesting EUD 106 (e.g., HttpClient). The request is transmitted at step 304 via the bearer network for the chosen delivery modality (e.g., Internet, and other interposed infrastructure, or DOCSIS/in-band QAMs of FIG. 2) to the serving client process within the MSO network, such as for example the JIT packager process 244 of FIG. 2a.

Once received by the target client process, the request is then forwarded to the CAM 240 at the designated address thereof per step 306.

At step 308, the CAM 240 evaluates the received request (including the embedded "short ID" as previously described herein if present) for format against one or more prescribed criteria as described in greater detail below. If the evaluation indicates that there is no match (i.e., the prescribed criteria are not met) per step 310, then per step 312, the counter is incremented for evaluation of the next subsequent request. If the evaluation indicates that the criteria are met, then per step 314 the CAM extracts the short ID and uses it to access the local database 242, in order to identify relevant complete address information for the requested content asset (e.g., the appropriate URL(s) for the one or more origin servers having the content asset stored thereon).

If the short ID is located in the DB 242 per step 316, then the relevant complete location or address information is extracted from the database file(s) per step 318.

Per step 320, a "redirect" message is then generated by the CAM 240 including the complete address information for the content element storage location that was extracted from the local DB 242 in step 318. Moreover, per steps 322 and 324, if any ancillary or parametric data (described in greater detail below with respect to FIG. 3a) was included within the initial request message received by the CAM 240, such data may also be included within the redirect message generated by the CAM.

Finally, the completed redirect message is transmitted back to the requesting client process (e.g., JIT packager 244) for use by the latter in accessing the content from the designated storage location per step 326.

It is appreciated that in the foregoing methodology 300, such content requests may be received in one format or protocol by the receiving entity, and reformatted into a different protocol or message type if desired, in each of the links between the EUD 106c and the ultimate recipient (e.g., CAM and designated origin servers) if required by the topology.

Figure 3A:
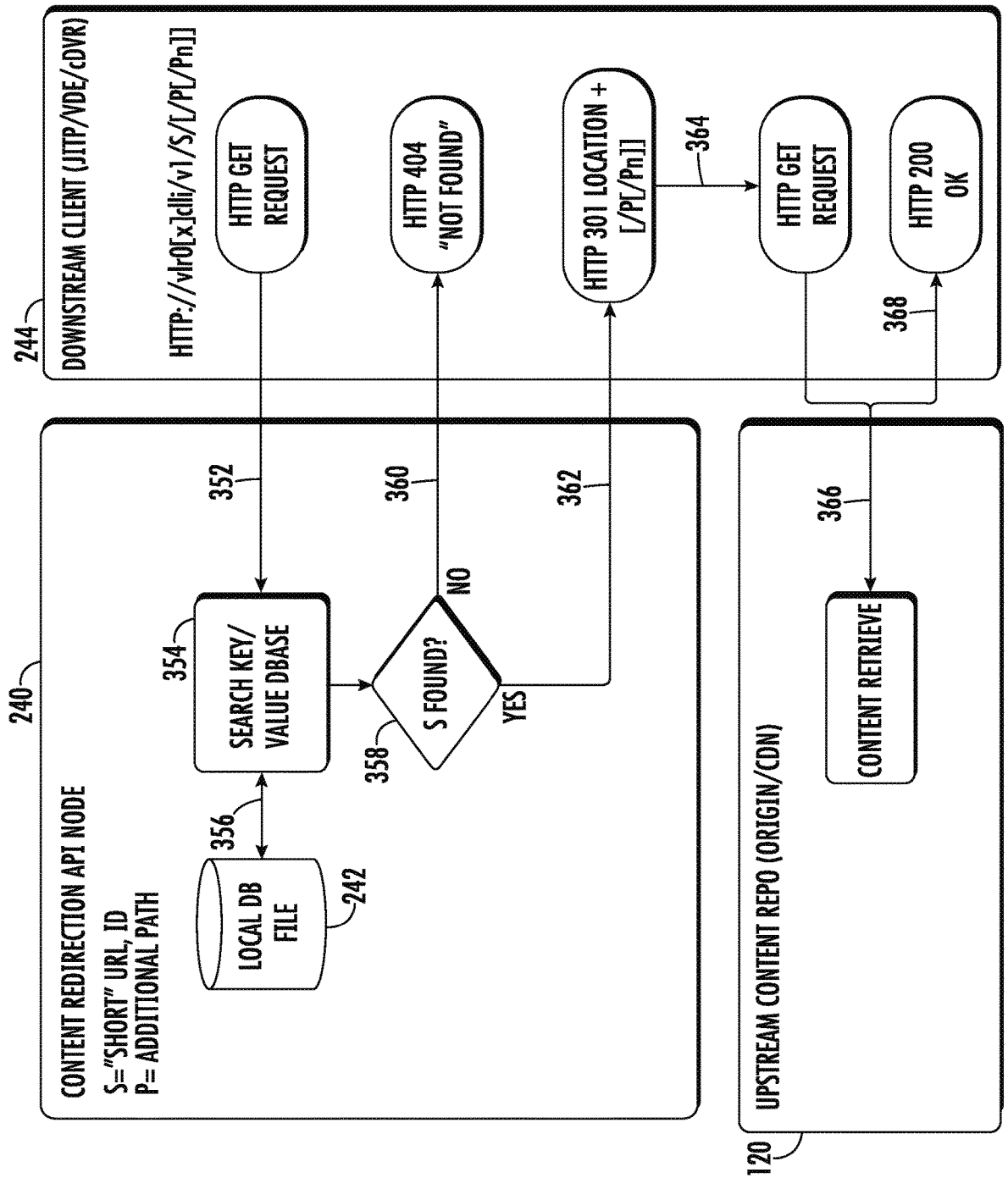
FIG. 3a is a graphical representation of one implementation of the method of FIG. 3, shown in the context of a client device (e.g., JIT packager, cloud DVR, or other network entity) within a content distribution network.

Referring now to FIG. 3a, one implementation of the general method 300 of FIG. 3 is described. In this implementation, the well-known HTTP protocol is used as the basis for communications between at least the requesting client process (e.g., JIT packager 244), the CAM 240, and the upstream content storage asset (e.g., origin server(s) 120). Specifically, as illustrated, the client process 244 issues an HTTP GET request to the CAM 240 per step 352. This request includes the aforementioned short ID, and is of the form shown below:

http://[FQDN]/v1/S/[P[/Pn]]

Where:

S/–Short ID+Slash (Required)
P–Additional Path Parameters (Optional)

For example:

http://v1r00enwdco.enwd.co.sc.charterlab.com/v1/Xqhv/maifest.mpd (wherein "S"=Xqhv)

In the exemplary implementation, the short ID (S) is selected so as to be limited to a prescribed number of alpha-numeric characters (e.g., 4), so as to both reduce storage requirements and file sizes, and importantly maintain each record as "human cognizable." Rather than utilize a comparatively long string of characters or binary/hex representation, a shorter alpha-numeric representation was chosen such that if the need arises for a human to interface with the data (e.g., during troubleshooting, maintenance, etc. by a field technician or the like), transfer and memorization of the character string would not be cumbersome. Given 0-9 (numbers) and a-z alphabetic letters, numerous unique 4-character combinations can be made, which more than supports the entire inventory of MSO "live" recorded content. Notwithstanding, it will be appreciated that the local database 240 may, if desired, be configured to accommodate a different identifier type altogether, which may already be present in an existing database such as used in the previously referenced Safehouse implementation. For example, in one such configuration, the longer (e.g., Safehouse-based) identifier is maintained in a table or other data structure so as to be related or correlated to the short ID, thereby allowing either to be used.

In one variant, the character strings (short IDs) are generated by a random string generator algorithm of the type well known in the computing arts, and the short ID assigned to the content asset. In one implementation thereof, the CAM 240 and local database 242 merely keep a key/value pair that has been given to it (by another network process, such as the aforementioned Safehouse system). The short ID is generated when the live asset is created in the live content workflow process, and the asset made available to the MSO's subscribers. The Safehouse system would generate the unique "long" ID for each asset as described above, and also generate a corresponding short ID. This short ID may be generated completely separate from the long ID (such as via a random generator algorithm), or alternatively derived in some manner from the long ID (e.g., via truncation or some other approach).

Random short IDs are further useful from security aspects; i.e., although the correlation between a given short ID value and content asset can be determined, there is no naming "scheme" or pattern per se, whereby a surreptitious entity might corrupt the scheme (e.g., all short IDs beginning with "X" do not in any way correlate to a given source, program channel, geographic area, or otherwise, thereby frustrating attempts to utilize such information for e.g., CAM DBM file corruption).

Returning to FIG. 3a, at step 354, the CAM 240 searches the local DB 242 using the short ID ("S") extracted from the request, for the appropriate address information. If a record correlating to the presented short ID is not found per step 358, then an HTTP 404 "not found" message is generated per step 360. If one or more records are found, then per step 362 the CAM 240 assembles an HTTP "301" message which includes the location/address information obtained from the DB entry or entries associated with the short ID, as well as any ancillary or additional information such as path information, and transmits the HTTP 301 message to the requesting client 244 at its designated network address. For example, in one implementation, "/P" (and anything beyond it, including "/PN") would be included in the HTTP 301 response to the requester. This allows flexibility in requesting content that may not exist at the root of the origin location, but in a sub-folder of the root. As one illustration, so-called "DASH-TS" packaging (among others) typically uses sub-folders in this manner. For instance, a request to the CAM 240 may be configured such as:

http://v1r01enwdco/v1/AA32/manifest.mpd

This request would generate an HTTP 301 message as follows:

http://v1p01enwdco/hbo_hd/manifest.mpd

Another example request to the CAM 240 might be structured as follows:

http://v1r01enwdco/v1/AA32/subfolder1/content.ts

This request would generate an HTTP 301 message as follows:

http://v1p01enwdco/hbo_hd/subfolder1/content.ts

In the exemplary implementation, these (optional) parameters are added to the end of the CAM's HTTP 301 response, although it will be recognized that other URL structures and/or placements of the optional data may be used consistent with the present disclosure.

In one implementation, the entire configuration of the CAM 240 is handled in /etc/httpd/conf/httpd.conf as a "virtual host." A rewriting process or engine (e.g. Mod_Rewrite within the exemplary Apache server implementation) reads each content request, and applies its designated rewrite rules to any requests that match the prescribed criterion; e.g., initial path, plus an arbitrary designator (e.g., "v1" in the example shown above). It is also noted that, should a later or alternate iteration be desired to work in parallel, designations such as "v2", "v3", etc. can be implemented for such purposes.

It is noted in passing that while the Apache server environment is used in the exemplary implementations described herein, other environments (including other "off the shelf" suites) may be used as well consistent with the present disclosure. For example, the CAMs 240 described herein may be built on NGINX using indigenous Rewrite Rules and ngx_http_map_module, the latter which also provides for a key/value lookup. Notably, instead of using a map file of the type described herein as in Apache, NGINX uses hash tables to lookup key/value pairs.

At FIG. 3a, if the request matches the criterion, the short ID that is passed in the request is checked against the database file within the local database 242, for example located at a designated location (e.g., "/opt/cam/data/map.db"). If a match exists, the request is re-written with the long URL from the extracted database result, into an HTTP 301 Permanent Redirect message and the rewrite process stopped, as shown in the exemplary code of FIG. 3c.

Figure 5:
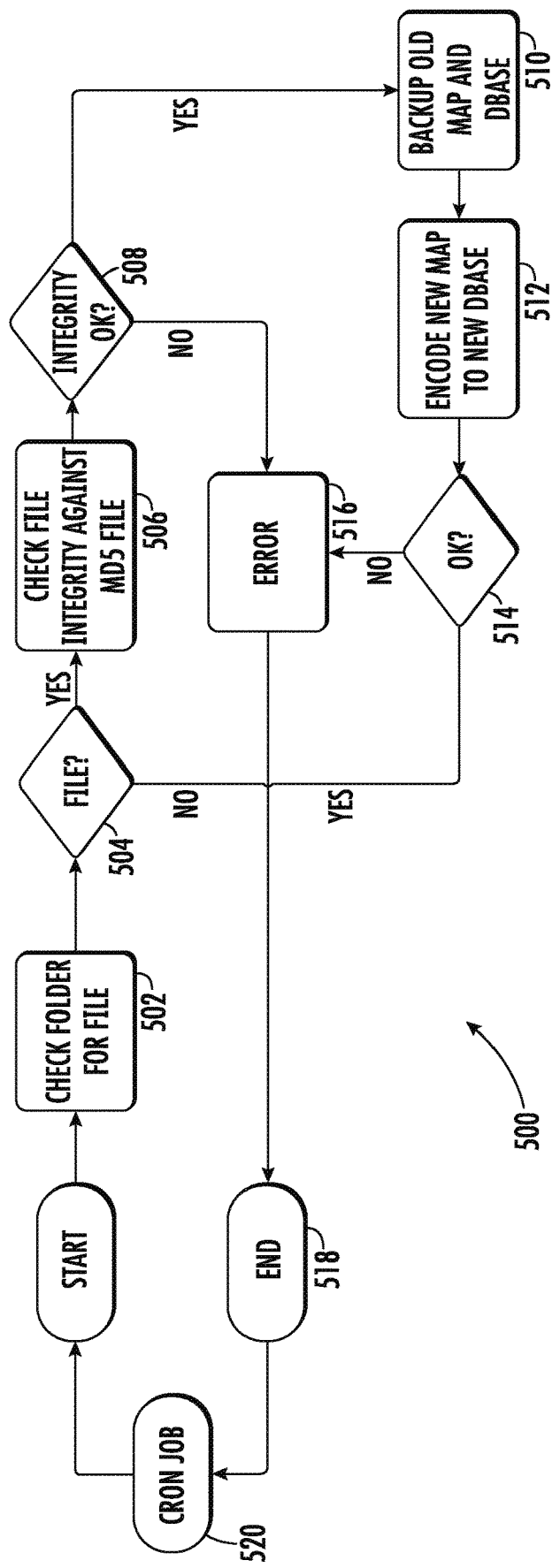
FIG. 5 is a graphical representation of one implementation of a method of automatic updates of the local database for content redirection according to the present disclosure.

In the exemplary implementation, a CAM 240 references a DBM file, which is encoded from a text-based map file. The map file in one variant consists of tab-delimited key-value pairs, with each pair delimited by line break (see FIG. 3d). In order for the exemplary CAM server process to access the data, the map file is encoded to a DBM file using a relevant encoder for that software environment. For example, in the exemplary Apache server environment, httxt2dbm (a DBM file encoder included in the Apache suite) is utilized for this purpose. In that manual changes to the DBM file directly could corrupt the data integrity of the file, re-encoding the map file is the recommended approach, as httxt2dbm applies a differential update to the DBM file. In the exemplary embodiment, when the DBM file is updated, the Apache server flushes its cache and re-reads the entire database for changes, thereby advantageously eliminating the need to restart the server after a change or update, and the entire process can be completed very quickly (e.g., less than one second), thereby reducing overall system latency for updates. FIG. 5 (discussed below) illustrates an exemplary DBM file update procedure.

As previously noted, if a digital content asset needs to be moved internally from one storage location to another, only the DBM file (versus all network client JITP or cDVR processes) need be updated to reflect a change in the asset location. Moreover, in the event of a channel/group/site failover or incipient maintenance requirement, content URLs can be changed quickly to re-direct JITP or other clients to the designated backup site(s), thereby providing enhanced flexibility to operational processes and/or personnel to implement changes with no need to send URL or other updates to other processes/personnel within the managed network infrastructure.

Returning again to FIG. 3a, the packager 244, having received the HTTP 301 message, extracts the "payload" (e.g., origin server URL) information, and generates an HTTP GET message including the relevant portions of the payload (step 364). This GET message is then transmitted per step 366 to the designated one or more addresses or paths specified by the payload; e.g., to one or more network-based origin servers 120. Note that one or more intermediary entities may be used as well, such as a CDN cache 264 (see FIG. 3b), or where the origin servers 120 are part of a cluster or array which is fronted by a local server or management process; in such cases, the CDN cache, local server or management process will handle the GET request of step 366 as any other request presented for content.

When the GET request is serviced by the origin server(s) 120 or local server, an HTTP 200 OK message is generated per step 368.

Figure 3B:
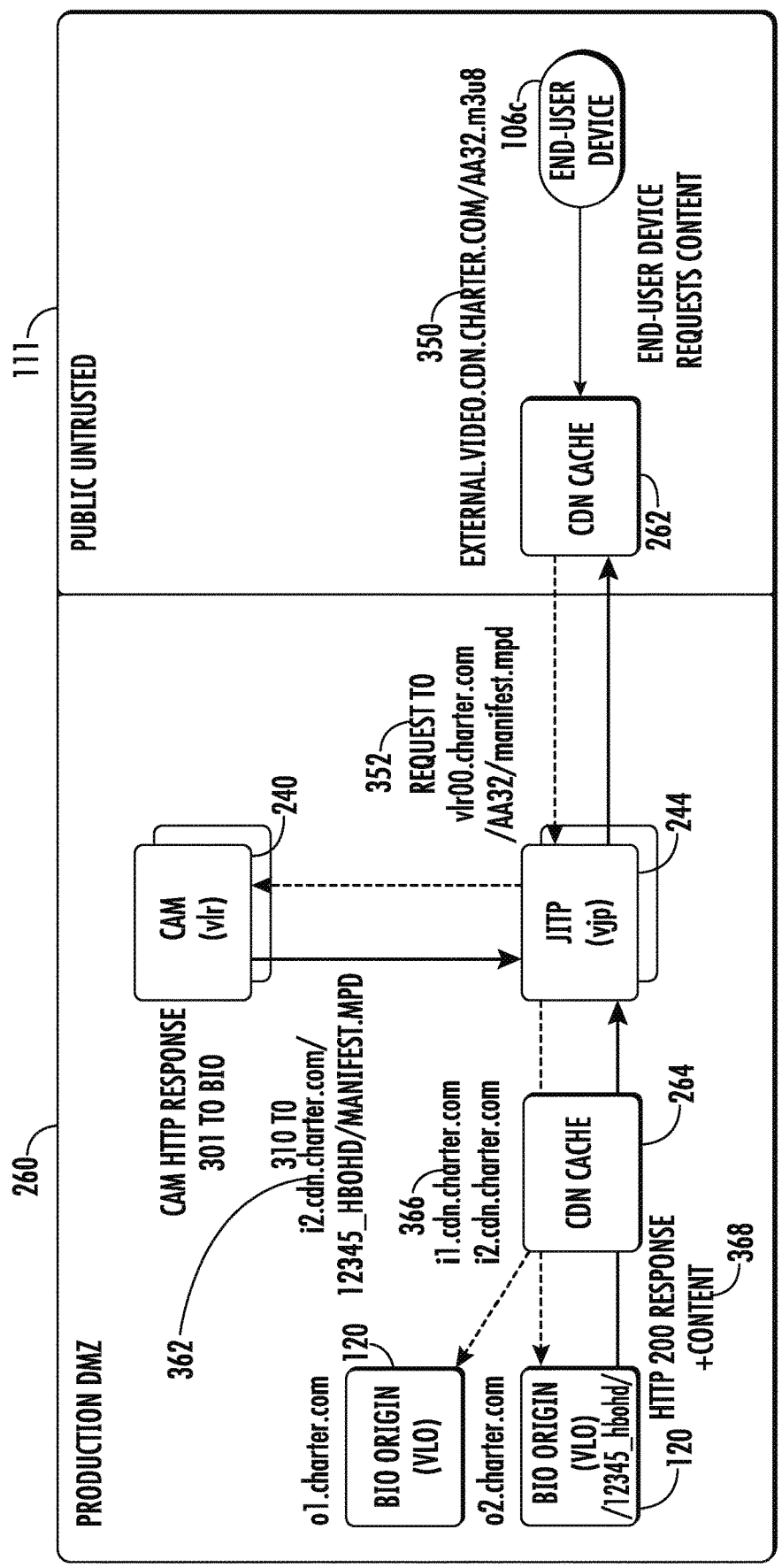

FIG. 3b illustrates exemplary URL addressing for the implementation of FIG. 3a.

FIG. 3e illustrates an exemplary implementation of a CAM directory structure in accordance with the present disclosure.

Failover/Reliability—

In some implementations of the architecture of FIG. 2a, each CAM 240 (there may be several spread across any give particular network infrastructure) is configured for high availability; i.e., with redundancy and reliability considered in the structure of the architecture. This is a significant factor, since all JITP and cDVR content requests may be run through one CAM 240 or another (due, for example, to the stateless nature of HTTP requests used by the client JIT packagers and cDVRs for requesting content assets). Accordingly, in one exemplary implementation, the CAMs 240 are run in a completely stateless fashion, and simply respond with HTTP redirects (e.g., 301 messages) based on the search of that CAM's local database. Therefore, any CAM 240 can respond to any content request from a client process. This is also advantageous from a scalability perspective; i.e., as described in greater detail below, individual CAM instances (e.g., rendered as VMs running in the designated server environment such as Apache) can be readily replicated, each in effect being a clone of the others, and allowing for limitless scaling of network JITP/cDVR request capacity as needed.

To that end, various architectures and topologies may be used, leveraging this innate redundancy (i.e., each CAM can operate effectively autonomously of the others if required). Hence, in one implementation, DNS "round-robin" techniques are utilized in CAM allocation, such that a given client or client "cluster" can interface with any one of many CAMs, and client process request load is distributed or balanced more evenly throughout available CAM nodes.

Figure 4A:
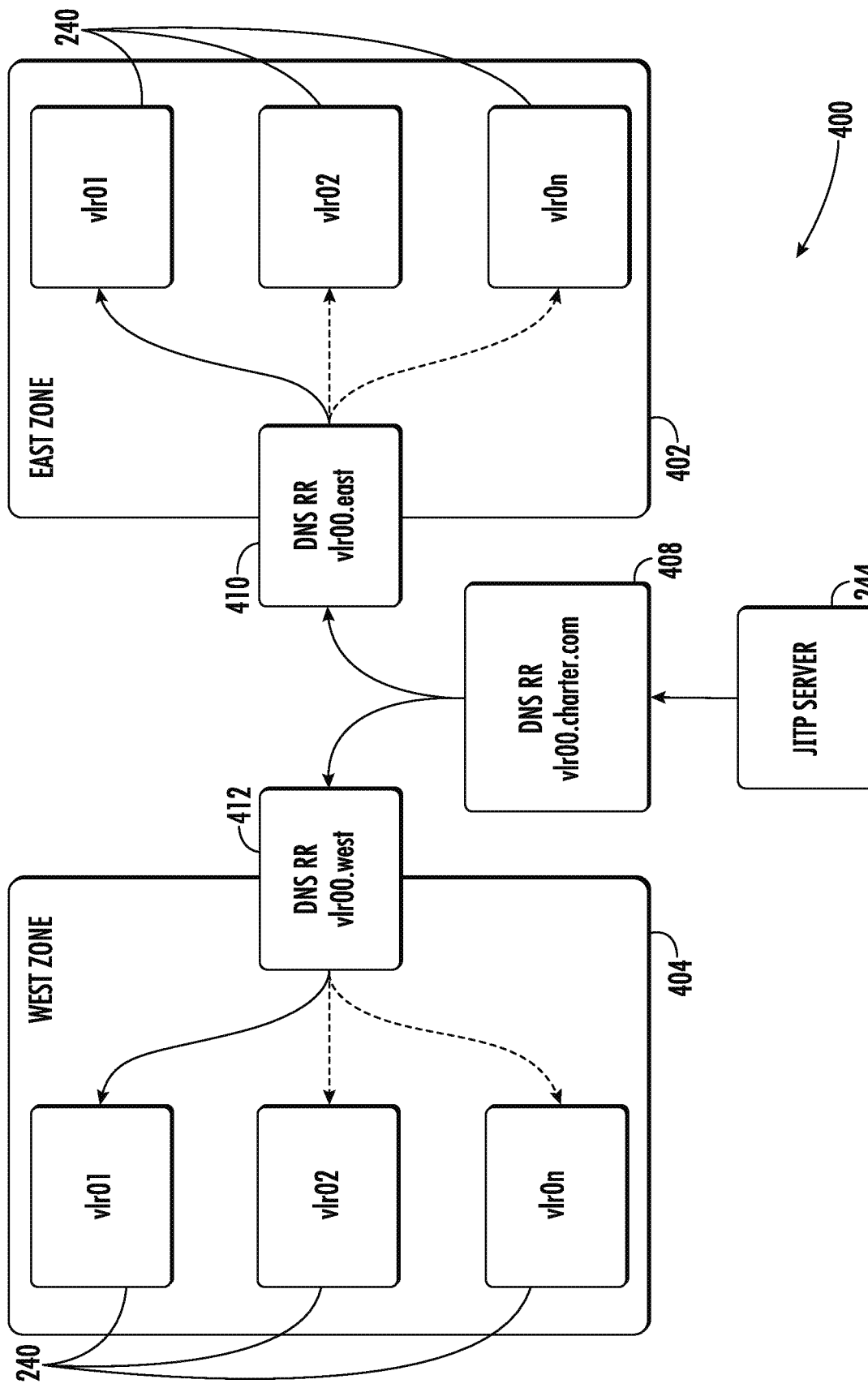
FIG. 4a is a logical block diagram of an exemplary architecture for implementing high availability redirect functionality using DNS (domain name servers) according to one embodiment of the disclosure.
Figure 4B:
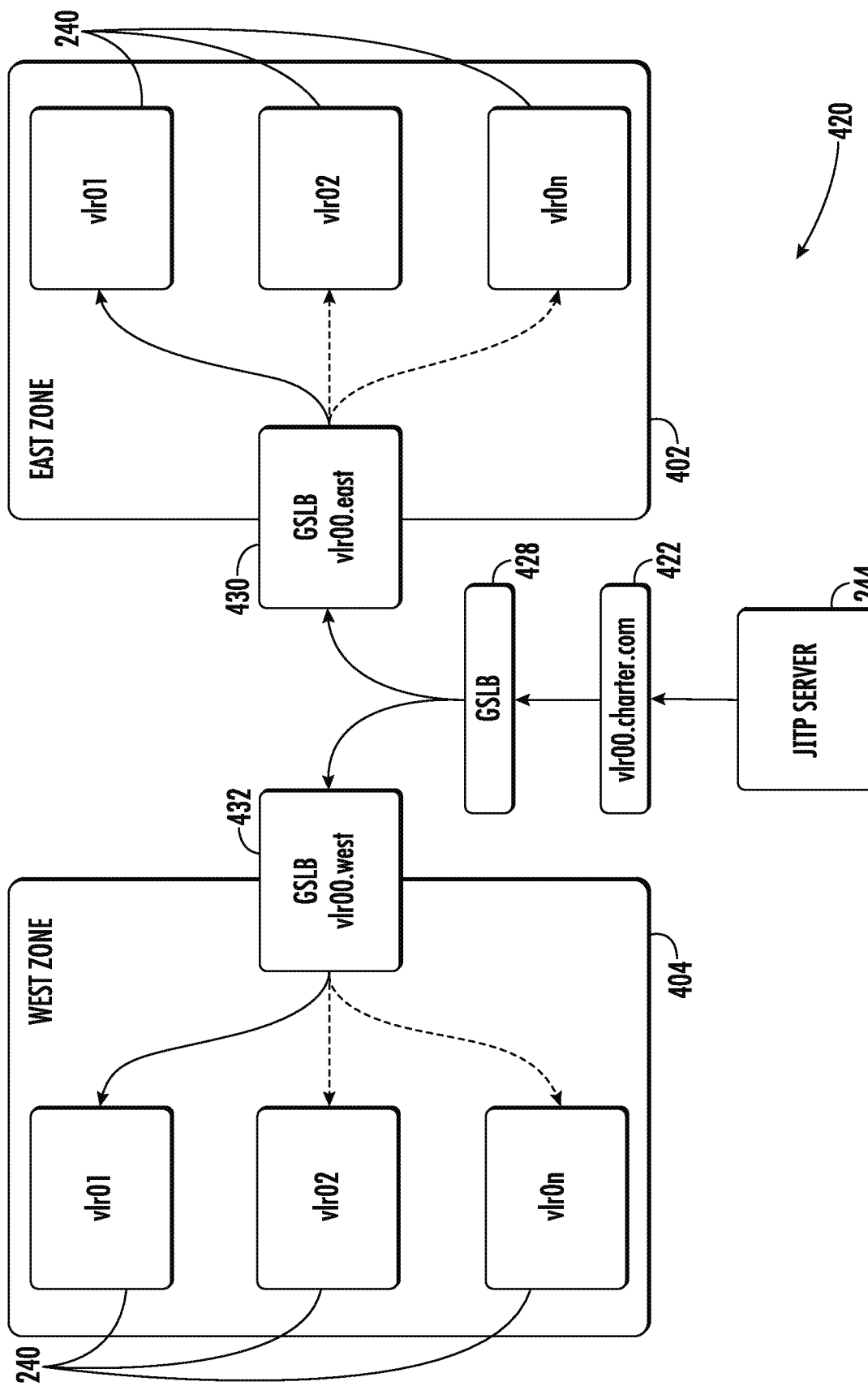
FIG. 4b is a logical block diagram of an exemplary architecture for implementing high availability redirect functionality using Global Server Load Balancing (GSLB) according to another embodiment of the disclosure.

FIGS. 4a and 4b illustrate exemplary high-availability and redundant configurations for CAM load balancing within the exemplary network architecture of FIGS. 2-2a. As shown in FIG. 4, a first architecture 400 uses a centralized DNS round robin (RR) allocation process 408 as an entry point for the client process (e.g., JIT packager 244) request. These requests are then distributed to a prescribed number (here two, for hypothetical East and West service zones 402, 404) of sub-portions of the architecture each served by a respective DNS RR 410, 412, which each distribute client (JITP) requests for content assets to respective CAM nodes 240 according to a distribution algorithm such as the aforementioned round-robin approach.

In one implementation DNS entries for CAM 240 nodes use a directory structure such as "v1r[xx][clli].[clli].[state].charter.com", although this particular configuration is merely exemplary.

Similarly, in the configuration 40 of FIG. 4b, the client process 244 utilizes a single CAM entry point 422, which then communicates with a Global Server Load Balancer (GSLB) process 428 to allocate the requests to e.g., two "zone" GSLBs 430, 432 for balancing of request load across the various CAMs 240 within each zone.

Moreover, in the exemplary implementation, each CAM 240 is sized and structured to handle sufficient numbers of requests without significant latency, since speed of response is also critical (to, inter alia, maximize user experience). This is especially true in case where, as noted above, every request from a JITP or cDVR may by design first be processed by a CAM 240. If the CAM "bottlenecks" under heavy load, then undesirable latency will result. To this end, the exemplary Apache-based configuration used for the CAMs 240 is optimized to be very lightweight, with only the minimum required modules enabled to allow very fast redirect response times.

It is noted that the exemplary Mod_Rewrite implementation described above (Apache environment) natively supports several database options, including a simple indexed database file located on-disk (e.g., in the mass storage of the local DB device 242 of FIG. 2a. In addition, Apache processes all keys (the exemplary DB maintains key:value formatted data pairs) that have been requested from the database file (unless a change is made to the database, which would be rare), so any file-access bottlenecks are eliminated. Specifically, in one embodiment, the processing includes indexing of values requested from the database file; that index is loaded into local RAM (see discussion of FIG. 6 below). The initial request reads from the DB file, yet subsequent requests use the RAM index, which advantageously results in a faster response by the CAM 240.

Automatic Updates—

FIG. 5 illustrates one embodiment of a methodology for automatically updating the local database 242 according to the present disclosure. It will be appreciated that while this update procedure is performed automatically at a prescribed periodicity (e.g., once every 5 mins), the update schedule may be also or alternatively event-driven (e.g., based on the occurrence of an event such as movement of content assets within a storage device, deletion/addition of content assets, indication of a failover or after maintenance, etc.).

It will also be appreciated that the performance of the automatic updates described herein provides a salient benefit to the network operator (e.g., MSO). By virtue of having the numerous origin server or other locations of live (and potentially other) content assets automatically updated at a high frequency, both: (i) more assets can be ingested/stored/accessed under a given infrastructure, and (ii) latency of client request servicing is greatly reduced. Moreover, operational support needs are greatly reduced, since manual or other means of updating every client process is wholly obviated.

As shown in FIG. 5, the method 500 includes first checking a designated storage location (e.g., a folder, such as "/home/cam/import" used as a "hot" folder) for the presence of the database file per step 502. Per step 504, if the file is present, the file integrity is next verified, such as using an MD5 hash or other cryptographic mechanism at step 506. Assuming the integrity of the file to be acceptable per step 508, the prior map and DB are first backed up per step 510, and the new map/DB encoded per step 512, as previously described herein with respect to FIGS. 3-3d. At step 514, the data is checked for errors (e.g., using the aforementioned exemplary Safehouse system configured to check exit status on the encode process (e.g., "0" (good) or ">0" (bad)). Assuming no errors at step 514, the process returns to step 504 and awaits expiration of the timer (and/or event occurrence as previously described). If any of the file presence (step 504), integrity (step 508), or post-update (step 514) checks fail, and error condition is identified per step 516, and the process terminated at step 518.

As noted previously, since each CAM 240 holds its own copy of the DBM file, each node must be updated independently. In practice, each CAM utilizes the foregoing "hot folder" that accepts new map files from a remote management system such as Safehouse. In one implementation, the hot folder is made accessible only via an SSH connection for security purposes.

Once an updated map file has been uploaded to the node, a script (such as that described above with respect to FIG. 5) will verify the uploaded file's integrity, create a backup of the existing DBM and map files (renamed to identify the date and time), and encode the new map file to replace the old DBM file (using httxt2dbm). Using a simple HTTP request to the CAM node will show the date/time/version of the updated map file that was last successfully encoded. This allows a remote management system to run node health checks, keep track of the DBM version in each node, and notify MSO personnel of potential inconsistencies between various instances of the DBM file (e.g., across multiple different CAMs 240).

As described in greater detail below, in one implementation of the automatic update procedure, the appropriately-formatted TXT file and an MD5 checksum file are placed in the import ("hot") folder. The import script will find the TXT file, and check the MD5 against it. If the check is successful, the existing database file is backed up, and a new database is encoded from the TXT file as previously described. Once the update attempt has completed, the health check JSON file (FIG. 3e) is updated with the status.

Security Aspects—

Since CAM node availability is an important part of MSO "live" linear content and cDVR data flows, each node should be secure from, inter alia, surreptitious activity from the public Internet/ISP network 111 (FIG. 2a) or other sources.

Accordingly, in one exemplary embodiment, the CAMs 240 are each configured to utilize a single non-public IP address within a production "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet (and hence MSO customers seeking to access MSO-based services or OTT content via the public or untrusted network), but the rest of the internal MSO infrastructure remains unreachable or partitioned. This provides an additional layer of security to the internal infrastructure, as it restricts the ability of surreptitious entities or processes to directly access internal MSO servers and data via the untrusted network.

Hence, in the present context, each CAM 240 is within a given DMZ is designed to respond to any HTTP request that it receives, yet the scope of such requests is limited by virtue of use of the non-public IP space. However, even though a CAM 240 resides in non-public IP space, there are still several risks, including HTTP-based attacks. Accordingly, the architectural data flow of the exemplary implementation described herein accounts for these risks by placing several layers of security in front of any CAM 240, including CDN caches 262 and JIT packagers (see FIGS. 2a and 3b), and further restricting the CAMs to a limited set of functions.

Notably, typical CDN caches 262 and JIT packagers 244 are built as "bastion" hosts, with enhanced security that advantageously provides protection for a CAM Or cluster of CAMs), such as via use of access-map request filtering and URL hashing (in the case of the CDN cache 262), and URL translation from an "unsafe" request (such as additional GET or POST parameters) to a "safe" request (in the case of JIT packager 244).

In addition, the CAM 240 of the exemplary implementation is configured to only respond to a restricted set of protocol functions; i.e., HTTP GET requests; PUT, POST, and DELETE requests are not allowed, and will receive a 403 FORBIDDEN response. Furthermore, maintenance-based activity (such as database updates, etc.) are handled with SSH connections, including using RSA key authentication from a prescribed "white list" of allowed hosts.

Moreover, additional measures are contemplated for protection of the CAMs 240 from internal threats, including utilization of a "chroot jail" (e.g., an operation that changes the apparent root directory for the current running process and its children; a program that is run in such a modified environment cannot name (and therefore normally cannot access) files outside the designated directory tree), secure passwords, so-called sudo ("super-user do" and similar) access, instead of allowing login from root, and a limited set of RSA keys from jump hosts for access.

In addition to the foregoing measures, further security features may be employed within the file structure and system to ensure that database file changes are not surreptitiously entered (given the importance of the integrity of the file to proper JIT packager and cDVR performance, and hence subscriber/user experience). Specifically, in one implementation, the TXT file placed in the directory (described above with respect to FIG. 5) must conform to a prescribed naming standard, such as the following:

map_MMDDYYYY_HHMMSS.[txt|md5]

Where:

map_=Required prefix

MMDDYYYY_=8-digit date code (ex. "Jun. 15, 2016"=06152016) followed by an underscore HHIVIMSS=6-digit time code (ex. "3:14:05PM"=151405)

.[txt|md5]="txt" for the actual map file, "md5" for the file containing the MD5 checksum In addition to the TXT file, an MD5 file must be included in the import directory. The format of the MD5 filename is the same as the TXT file format, with the .txt replaced with .md5 at the end. With the exception of the extension, the MD5 filename must match the TXT filename, or it will not be detected, and the TXT file will not be imported.

It is noted that while multiple TXT files can exist in the import directory at the same time, the script will only attempt import on the TXT file that was most recently modified. After a successful import, all files are deleted from the import directory.

Exemplary CAM Node Apparatus—

The exemplary embodiments of the CAM 240 and associated local database 242 described herein may be implemented using general purpose software and/or hardware resources. For example, the software may comprise a Linux operating system (OS) based server application such as the aforementioned exemplary Apache-based environment.

Figure 6:
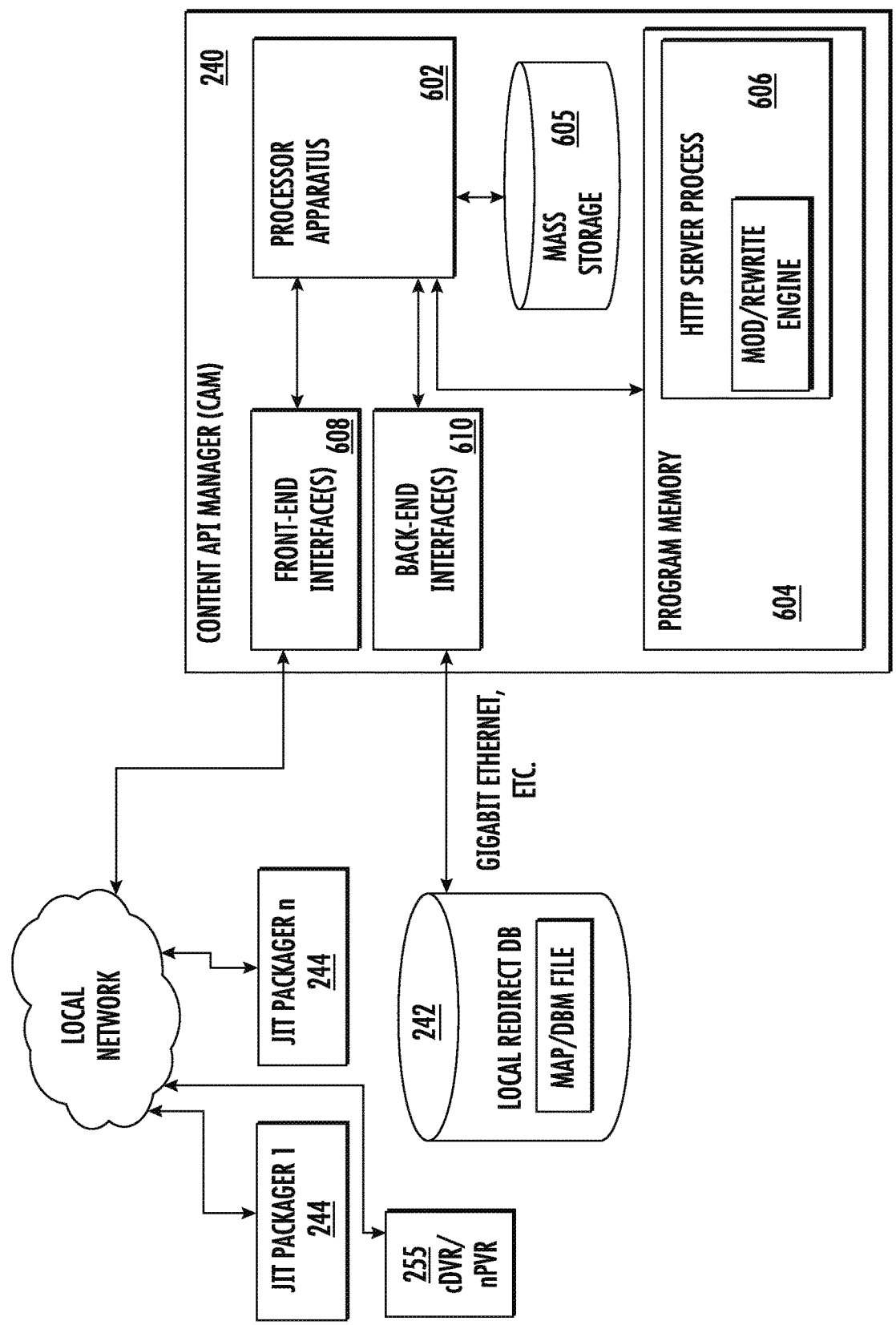
FIG. 6 is a functional block diagram of an exemplary embodiment of the content API management (CAM) apparatus according to the present disclosure.

Hardware resources can include for example general-purpose computing hardware. FIG. 6 depicts an exemplary embodiment of a CAM node apparatus 240 of a packetized network useful for providing content as described herein. The CAM node 240 includes processing logic 602 (e.g., a processor) configured to execute one or more software modules 606 stored in program memory 604, a mass storage device 605 to support data storage (including for instance the DBM file, where the local (redirect) DB 242 is physically and logically integrated with the CAM 240 itself), and one or more front-end interfaces 608, as well as one or more back-end interfaces 610. The front-end interfaces 608 include one or more network interfaces for communication (via a LAN as shown) to JIT packagers 244 (or cDVRs/nPVRs 255) in FIG. 2*a*, and/or other network "client" entities. The memory 604 in one variant is characterized by lower access time, compared to the mass storage 605, the latter which comprises a nonvolatile medium (e.g., magnetic, optical, and/or charge based (e.g., flash), while the memory 604 may comprise a volatile medium (e.g., DDR2/DRAM, SRAM, and/or other).

In one or more implementations, the CAM node 240 is configured using commercial off-the-shelf computing platform (e.g., a Cisco UCS Blade with Intel processors, running VMWare ESXi 5.5, although it will be appreciated that other types of hardware/software environments may be used; e.g., any x86 hardware, running CentOS in a "bare metal" configuration or virtual machine), which advantageously obviates the need for custom or specialized hardware. Hardware and/or software configurations of individual nodes (e.g., where multiple CAMs are used in the MSO network) may be set in accordance with requirements of a target application; e.g., for CAMs fielding only JIT packager requests, each CAM node may be configured identically. However, in some implementations, the network may have a heterogeneous configuration, wherein the hardware configuration of individual CAM nodes is tailored in accordance with specific cost and/or performance requirements (e.g., some may be purposely made more capable in terms of performance than others).

In some implementations, a given hardware node configuration configured, e.g., to support linear content delivery, is augmented to support cDVR or nPVR by use of additional storage (e.g., hard disks or SSDs). The additional storage can be embodied within the node serve, and/or as an attached array (e.g., via a serial bus and/or as network attached storage).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of processing digital content requests issued from respective ones of a plurality of network-based content provision processes, the computerized method comprising:

receiving, at a centralized network function, data representative of respective requests for respective digitally rendered content elements, the requests issued from the respective ones of the plurality of network-based content provision processes;

processing each of the respective requests using the centralized network function to extract respective ones of data identifiers associated with the respective digitally rendered content elements;

utilizing the extracted respective ones of the data identifiers to access a database to cross-reference the respective ones of the data identifiers with location data for the respective digitally rendered content elements, the database comprising a first database file structure generated via encoding of a second file structure, the access of the database comprising a read of the first database file structure;

generating respective messages for transmission to the respective ones of the plurality of network-based content provision processes including the respective cross-referenced location data, the respective messages configured to enable each of the plurality of network-based content provision processes to utilize their respective location data to redirect to one or more network locations where the respective digitally rendered content elements can be accessed;

causing the transmission of the respective messages to the respective ones of the plurality of network-based content provision processes;

monitoring for at least one event relating to one or more of the respective digitally rendered content elements;

based at least one the occurrence of the at least one event, causing an update of the database only, the update of the database comprising encoding of an updated version of the second file structure to produce an updated version of the first database file structure;

based at least on a completion of the update, causing the centralized network function to read the updated version of the first database file structure in its entirety; and based at least on the read of the updated version, causing generation of at least one second protocol-based message, the at least one second protocol-based message enabling at least the respective ones of the plurality of network-based content provision processes to access at least a portion of the respective digitally rendered content elements at a second network storage location;

wherein at least the encoding of the updated version of the second file structure to produce the updated version of the first database file structure and the read of the updated version of the first database file structure in its entirety, reduce latency associated with at least delivery of the at least one second protocol-based message so as to enable meeting of one or more latency requirements.

2. The computerized method of claim 1, further comprising issuing, using at least the respective ones of the plurality of network-based content provision processes, the respective requests for the respective digitally rendered content elements responsive to receiving respective ones of requests from one or more content distribution network caches, the one or more content distribution network caches associated with one or more untrusted public internetworks, the one or more content distribution network caches in data communication with a plurality of end-user devices.

3. The computerized method of claim 1, wherein:
the plurality of network-based content provision processes comprise a plurality of just-in-time (JIT) packager processes each having a prescribed time or latency constraint; and the computerized method is performed to allow the provision of the respective digitally rendered content elements to respective requesting end-user device with the respective prescribed time or latency constraints.

4. The computerized method of claim 1, wherein the receiving of the data representative of the respective requests for the respective digitally rendered content elements comprises receiving data representative of respective requests for live or linear digitally rendered content during original transmission or broadcast thereof, and the redirection is performed substantially in real time.

5. The computerized method of claim 1, further comprising issuing, using at least the respective ones of the plurality of network-based content provision processes, the respective requests for the respective digitally rendered content elements, the issuing comprising using at least one algorithmic computerized process to truncate or convert respective first network addresses associated with the respective digitally rendered content elements to respective network-specific identifier (ID) values, the network-specific ID values each shorter in character or bit length than their respective first network addresses.

6. The computerized method of claim 5, wherein the using of the at least one algorithmic computerized process to truncate or convert the respective first network addresses associated with the respective digitally rendered content elements to the respective network-specific ID values, the network-specific ID values shorter in character or bit length than their respective first network addresses, comprises using a modification/rewrite software engine to convert the respective first network address to the respective network-specific identifier (ID) values having a prescribed length.

7. The computerized method of claim 1, wherein the receiving of the data representative of the respective requests comprises utilizing a security mechanism which restricts receipt of requests to requests associated with one or more prescribed protocols only.

8. The computerized method of claim 7, wherein the utilizing of the security mechanism which restricts the receipt of the requests to the requests associated with the one or more prescribed protocols only comprises utilizing a security mechanism which allows only receipt of HTTP GET requests.

9. The computerized method of claim 1, wherein the processing each of the respective requests using the centralized network function to extract the respective ones of data identifiers comprises extracting a network-specific identifier (ID) value associated with a network address, the network-specific ID value comprising a truncated value of the network address that is shorter in character or bit length than the network address.

10. The computerized method of claim 1, wherein:
the plurality of network-based content provision processes each comprise a JIT (just in time) packager process in data communication with the centralized network function via a managed network;
the at least portion of the respective digitally rendered content elements has the one or more latency requirements associated with delivery thereof relative to at least the first portion; and
the monitoring for the at least one event relating to one or more of the respective digitally rendered content elements is configured such that the access of the at least portion of the respective digitally rendered content elements by the respective ones of the plurality of JIT packager processes at least meets the one or more latency requirements.

11. Computer readable apparatus comprising a non-transitory storage medium, the non-transitory storage medium comprising at least one computer program having a plurality of instructions, the plurality of instructions configured to, when executed on a processing apparatus, cause a computerized server apparatus to:

receive data representative of respective requests for respective digitally rendered content elements, the requests issued from respective ones of a plurality of network-based content provision processes;

process each of the respective requests to extract respective ones of data identifiers associated with the respective digitally rendered content elements;

utilize the extracted respective ones of the data identifiers to access a database to obtain location data for at least a first portion of the respective digitally rendered content elements, the location data obtained via a cross-reference of the respective ones of the data identifiers with the location data for the at least first portion of the respective digitally rendered content elements, the database comprising a first database file structure generated via encoding of a second file structure, the access of the database comprising a read of the first database file structure;

generate respective messages for transmission to the respective ones of the plurality of network-based content provision processes including the respective location data, the respective messages configured to enable each of the plurality of network-based content provision processes to utilize their respective location data to redirect to one or more network locations where the at least first portion of the respective digitally rendered content elements can be accessed;

cause transmission of the respective messages to the respective ones of the plurality of network-based content provision processes;

monitor for at least one event relating to at least one of the digitally rendered content elements;

based at least on an occurrence of the at least one event, cause update of the database only, the update of the database comprising encoding of an updated version of the second file structure to produce an updated version of the first database file structure;

based at least on a completion of the update, read the updated version of the first database file structure in its entirety; and based at least on the read of the updated version, cause generation of at least one second protocol-based message, the at least one second protocol-based message enabling at least the respective ones of the plurality of network-based content provision processes to access at least a second portion of the respective digitally rendered content elements at a second network storage location;

wherein at least the encoding of the updated version of the second file structure to produce the updated version of the first database file structure and the read of the updated version of the first database file structure in its entirety, reduce latency associated with at least delivery of the at least one second protocol-based message so as to enable meeting one or more latency requirements.

12. The computer readable apparatus of claim 11, wherein:

the update of the database enables each of the plurality of network-based content provision processes to individually access at least the second portion of the respective digitally rendered content elements via respective accesses of the database; and the individual accesses are configured to occur without any update of respective databases of the respective ones of the plurality of network-based content provision processes.

13. The computer readable apparatus of claim 11, wherein:

the monitoring for the at least one event relating to the at least one of the digitally rendered content elements comprises monitoring for at least one change in network storage location of at least the second portion; and the second portion comprises a portion which is temporally subsequent to the first portion.

14. The computer readable apparatus of claim 11, wherein:

the plurality of network-based content provision processes each comprise a JIT (just in time) packager process in data communication with the computerized server apparatus via the network;

the second portion of the respective digitally rendered content elements has the one or more latency requirements associated with delivery thereof relative to at least the first portion; and the monitoring for the at least one event relating to the at least one of the digitally rendered content elements is configured such that the access of the second portion by the respective ones of the plurality of JIT packager processes at least meets the one or more latency requirements.

15. The computer readable apparatus of claim 11, wherein the receipt of the data representative of the respective requests comprises utilization of a security mechanism which restricts receipt of requests to requests associated with receipt of HTTP GET requests only.

16. The computer readable apparatus of claim 11, wherein at least at least one data identifier comprises at least one network-specific identifier (ID) value associated with at least one respective network address, the at least one network-specific ID value comprising at least one respective truncated value of the at least one respective network address that is shorter in character or bit length than the at least one respective network address.

17. The computer readable apparatus of claim 16, wherein the access of the database comprises access of a central database configured to (i) act as a single point of contact for each of the plurality of network-based content provision processes, and (ii) relate the at least one network-specific ID value to the at least one respective network address where at least the first portion of the requested live digitally rendered content elements can be accessed by the plurality of network-based content provision processes.

18. A digital content manager apparatus, comprising:

a first interface configured to at least communicate with a plurality of network-based client processes;

a processor apparatus in data communication with the first interface; and a storage apparatus in data communication with the processor apparatus and comprising at least one computer program, the at least one computer program comprising a plurality of instructions which are configured to, when executed by the processor apparatus, cause the digital content manager apparatus to:

receive data representative of a request for digitally rendered content, the request issued from a network-based client process;

process the request to extract at least one data identifier associated with at least a portion of the digitally rendered content;

utilize the extracted at least one data identifier to identify location data associated with a first portion of the digitally rendered content, the utilization comprising access of a database for cross-referencing the at least one data identifier with the location data, the database comprising a first database file structure generated via encoding of a second file structure, the access of the database comprising a read of the first database file structure;

generate data representative of a message for transmission to the network-based client process including the location data, wherein the data representative of the message is configured to enable the network-based client process to utilize the location data to redirect to one or more network locations where the first portion of the digitally rendered content can be accessed;

cause transmission of the data representative of the message to the network-based client process;

monitor for at least one event relating to the digitally rendered content;

based at least on an occurrence of the at least one event, cause update of the database only, the update of the database comprising encoding of an updated version of the second file structure to produce an updated version of the first database file structure;

based at least on a completion of the update, read the updated version of the first database file structure in its entirety; and based at least on the read of the updated version, cause generation of a second protocol-based message, the second protocol-based message enabling the network-based client process to access at least a second portion of the digitally rendered content at a second network storage location;

wherein at least the encoding of the updated version of the second file structure to produce the updated version of the first database file structure and the read of the updated version of the first database file structure in its entirety, reduce latency associated with at least delivery of the second protocol-based message so as to enable meeting of one or more latency requirements.

19. The digital content manager apparatus of claim 18, wherein:

the digital content manager apparatus is disposed within a headend portion of a managed content distribution network;

the network-based client process is disposed at an edge or hub portion of the managed content distribution network; and the disposition of the digital content manager apparatus in the headend portion allows a single instance of the digital content manager apparatus to service content element requests from the plurality of network-based client processes via use of the database.

20. The digital content manager apparatus of claim 18, wherein the at least one data identifier comprises a network-specific identifier (ID) value associated with a network address, the network-specific ID value comprising at least one respective truncated value of the network address that is shorter in character or bit length than the network address.

* * * * *